US007119943B2

(12) United States Patent
Nelson et al.

(10) Patent No.: US 7,119,943 B2
(45) Date of Patent: Oct. 10, 2006

(54) PLATE-BASED MICROELECTROMECHANICAL SWITCH HAVING A THREE-FOLD RELATIVE ARRANGEMENT OF CONTACT STRUCTURES AND SUPPORT ARMS

(75) Inventors: Richard D. Nelson, Austin, TX (US); William G. Flynn, Austin, TX (US); David A. Goins, Austin, TX (US)

(73) Assignee: Teravicta Technologies, Inc., Austin, TX (US)

( * ) Notice: Subject to any disclaimer, the term of this patent is extended or adjusted under 35 U.S.C. 154(b) by 31 days.

(21) Appl. No.: 10/921,746

(22) Filed: Aug. 19, 2004

(65) Prior Publication Data

US 2006/0050360 A1 Mar. 9, 2006

(51) Int. Cl.
*G02B 26/00* (2006.01)

(52) U.S. Cl. ...................... 359/291; 359/290; 359/292; 359/295

(58) Field of Classification Search ................ 359/290, 359/291, 292, 293, 295, 298
See application file for complete search history.

(56) References Cited

U.S. PATENT DOCUMENTS

| | | | |
|---|---|---|---|
| 5,526,172 A | 6/1996 | Kanack | |
| 5,673,785 A | 10/1997 | Schlaak et al. | |
| 6,143,997 A | 11/2000 | Feng et al. | |
| 6,307,452 B1 | 10/2001 | Sun | |
| 6,486,425 B1 | 11/2002 | Seki | |
| 2003/0202735 A1* | 10/2003 | Dunec et al. | 385/16 |
| 2004/0036132 A1* | 2/2004 | de los Santos | 257/414 |

FOREIGN PATENT DOCUMENTS

| | | |
|---|---|---|
| EP | 1 321 957 | 6/2003 |

OTHER PUBLICATIONS

International Search Report, PCT/US2005/029557, mailed Nov. 16, 2005.

* cited by examiner

*Primary Examiner*—Alica M. Harrington
*Assistant Examiner*—Brandi Thomas
(74) *Attorney, Agent, or Firm*—Mollie E. Lettang; Daffer McDaniel, LLP

(57) ABSTRACT

A microelectromechanical system (MEMS) switch is provided which includes a multiple of three support arms extending from the periphery of a moveable electrode. In addition, MEMS switch includes a plurality of contact structures having portions extending into a space between a fixed electrode and the moveable electrode. In some cases, the relative arrangement of the support arms and the contact structures are congruent among three regions of the MEMS switch which collectively comprise the entirety of the fixed electrode and the entirety of the moveable electrode. In other embodiments, the contact structures may not be arranged congruently within the MEMS switch.

39 Claims, 9 Drawing Sheets

PLATE-BASED MICROELECTROMECHANICAL SWITCH HAVING A THREE-FOLD RELATIVE ARRANGEMENT OF CONTACT STRUCTURES AND SUPPORT ARMS

BACKGROUND OF THE INVENTION

1. Field of the Invention

This invention relates to microelectromechanical devices, and more particularly, to the arrangement and number of contact structures and support beams within a plate-based microelectromechanical device.

2. Description of the Related Art

The following descriptions and examples are not admitted to be prior art by virtue of their inclusion within this section.

Microelectromechanical devices, or devices made using microelectromechanical systems (MEMS) technology, are of interest in part because of their potential for allowing integration of high-quality devices with circuits formed using integrated circuit (IC) technology. As compared to transistor switches formed with conventional IC technology, for example, microelectromechanical contact switches may exhibit lower losses and a higher ratio of off-impedance to on-impedance. MEMS switch designs generally use an actuation voltage to close the switch, and typically rely on the spring force in the beam or plate to open the switch when the applied voltage is removed. In opening the switch, the spring force of the beam or plate must typically counteract what is often called "stiction." Stiction refers to various forces tending to make two surfaces stick together such as van der Waals forces, surface tension caused by moisture between the surfaces, and/or bonding between the surfaces (e.g., through metallic diffusion). Consequently, actuating a switch at a relatively low voltage tends to make the switch harder to open, resulting in a switch which may not open reliably (or at all).

For this reason, it is often desirable within MEMS switches to apply high actuation voltages, such as on the order of 50 volts or more, such that a complementary spring force sufficient to open the switch is stored within the switch. Such relatively high actuation voltages, however, often require voltage translation circuits when used with transistor switches, increasing the complexity of the circuit. In addition, relatively high actuation voltages increase the force attracting the electrodes of a MEMS switch. In some cases, the actuation voltages may be high enough to cause the electrodes to contact, causing the device to malfunction. As such, it is often desirable to optimize actuation voltages of MEMS switches such that the switch can reliably open and close but the electrodes can be prevented from contacting.

MEMS switch designs are often characterized by the form of their moveable component/s. For example, a cantilever-based MEMS switch includes a moveable beam supported at one end and free at another. In contrast, strap-based MEMS switches include a moveable beam supported at both ends. A third class of MEMS switches is diaphragm-based structures in which a membrane is supported around most or all of its perimeter. In some MEMS switches, a moveable plate is used instead of a cantilever beam, strap beam, or diaphragm membrane. In some embodiments, the moveable plate may be supported by support structures arranged at each of the four corners of the plate (i.e., when a square or rectangular plate is employed). The support structures of plate-based MEMS switches differ from support structures used for cantilever-based, strap-based and diaphragm-based MEMS switches in that they are configured to twist and bend such that the entire plate may move relative to a fixed electrode. Such an adaptation of support structures, however, may cause plate-based MEMS switches to be more susceptible to having electrodes collapse onto each other, particularly at high actuation voltages. In addition, high actuation voltages may cause the plate itself to bend such that a portion of the plate contacts the underlying gate electrode, particularly if the plate is not evenly supported by the structures. Consequently, the tolerance of actuation voltages for plate-based MEMS switches are often small or cannot be effectively optimized to allow the switches to be reliably opened and closed while simultaneously preventing the actuation electrodes of the switches from contacting one another.

It would, therefore, be desirable to develop a plate-based MEMS switch which relaxes the aforementioned constraints imposed by the use of high actuation voltages, namely opening and closing reliability and the prevention of collapsing electrodes.

SUMMARY OF THE INVENTION

The problems outlined above may be in large part addressed by a plate-based microelectromechanical system (MEMS) switch having sufficient support. In particular, a plate-based MEMS switch is provided which includes a multiple of three support arms extending from a moveable electrode which is spaced apart from a fixed electrode. In some cases, the fixed electrode may be formed upon a substrate and the moveable electrode may be spaced above the fixed electrode. In such embodiments, the multiple of three support arms may extend from the moveable electrode to different support vias coupled to the substrate. In some embodiments, the multiple of three support arms may extend radially from the moveable electrode. In other embodiments, at least one of the support arms may include a first portion extending radially from the moveable electrode and a second portion extending from the first portion at an angle greater than approximately 0 degrees relative to the first portion. For example, in some cases, the second portion may extend at an angle approximately 90 degrees from the first portion. In some embodiments, the second portion may include a plurality of meandering sections.

In some cases, the multiple of three support arms may be uniformly spaced about the moveable electrode. In other embodiments, the multiple of support arms may not be uniformly spaced about the moveable electrode. In either case, the multiple of three support arms may, in some embodiments, comprise all of the support arms extending from the moveable electrode. In other cases, the MEMS switch provided herein may include additional support arms distinct from the multiple of three support arms. In general, the support arms may include lengths between approximately 100 microns and approximately 1000 microns. Furthermore, the support arms may include widths between approximately 25 microns and approximately 100 microns. In embodiments in which the moveable electrode is circular, the multiple of three support arms may include widths between approximately 5% and approximately 20% of the diameter of the moveable electrode. In some cases, the shape of the moveable electrode may alternatively be a truncated circle. In yet other cases, the shape of the moveable electrode may be a three-pointed figure, such as a triangle or a three-pointed star. The thickness of the support arms may generally be between approximately 2 microns and approximately 10 microns. In some embodiments, the moveable electrode may be thicker than each of the multiple of three support arms. In some cases, the moveable electrode may include a base layer of metal having a substantially uniform thickness and one or more distinct segments of metal formed upon the base layer. In addition or alternatively, the underside of the moveable electrode may include extensions.

In any case, the MEMS switch may further include a plurality of contact structures having portions extending into a space between the fixed electrode and the moveable electrode to add support and/or provide electrical contact. In particular, the MEMS switch may include three or more contact structures and, more preferably, only three contact structures having portions extending into a space between the fixed electrode and the moveable electrode. In some cases, the contact structures may be concentrically arranged about the same axis as the support arms. Alternatively, the contact structures may be concentrically arranged about a different axis than the support arms. In yet other embodiments, the contact structures may not be arranged concentrically. In any of such cases, the MEMS switch may, in some embodiments, be substantially absent of a contact structure in a space between the fixed electrode and a center point of the moveable electrode. In addition or alternatively, the moveable electrode may include a cutout portion arranged proximate to a contact structure.

As noted above, the contact structures may, in some embodiments, be concentrically arranged about the same axis as the support arms. In some embodiments, each of the contact structures may be aligned between the axis and one of the support arms. In yet other embodiments, each of the contact structures may be arranged at an angular location that is distinct from the angular locations that the support arms are arranged. For example, in some cases, each of the contact structures may be arranged at an angular location which bisects angular locations of two adjacent support arms. In any case, the contact structures may be concentrically spaced from the axis by a distance between approximately 25% and approximately 100% of the span from the axis to the edge of the moveable electrode. For example, the contact structures may be concentrically arranged at a distance approximately midway between the axis and the edge of the moveable electrode.

In general, the MEMS switch may be configured such that any number of the support arms and the contact structures are electrically active with the moveable electrode. The term "electrically active" may generally refer to structures configured to pass and receive current. In contrast, the term "electrically inactive" may refer to structures which are not configured to pass and receive current. In some embodiments, one of the support arms and one of the contact structures may be configured to be electrically active while the other contact structures and support arms may be configured to be electrically inactive. In other cases, more than one or all of the contact structures and/or support arms may be configured to be electrically active. In any case, the contact structures may include different materials in some embodiments. For example, in some cases, the contact structures may include different conductive materials. In other cases, the contact structures may include non-conductive materials.

As noted above, the arrangement of the contact structures may, in some embodiments, be referenced relative to three regions of the moveable electrode. In some cases, the three regions may be defined by boundaries extending from each of the three support arms to a central region of the moveable electrode. Alternatively, the three regions may be defined by other boundaries. In yet other embodiments, the arrangement of the contact structures may be relative to three regions of the MEMS switch comprising the entirety of the fixed electrode and the moveable electrode. In any case, the arrangement of contact structures may, in some cases, be congruent relative to the three regions. In yet other embodiments, the arrangement of the contact structures may not be congruent relative to the three regions. In particular, the arrangement of one or more of the contact structures adjacent to one of the three regions may not be congruent with the arrangement of one or more of the contact structures adjacent to the other two regions.

Such a dissimilarity of congruency among the arrangement of the contact structures may be employed in a variety of manners. For example, in such embodiments, one of the contact structures may be arranged beneath an extension of the moveable electrode interposed between two support arms and coupled to a main section of the moveable electrode from which the support arms extend. The other contact structures in such an embodiment may be arranged beneath the main section of the moveable electrode. In yet other embodiments, one or more of the other contact structures may be arranged beneath one or more additional extensions arranged along the periphery of the moveable electrode. As noted above, in some embodiments, one or more contact structures may be configured to be electrically active while one or more other contact structures may be configured to be electrically inactive. In some cases, contact structures may be arranged relative to different regions of the moveable electrode with regard to whether they are electrically active or inactive to induce a dissimilarity of congruency among the arrangement of the contact structures. In particular, the electrically inactive contact structures may be arranged under areas of the moveable electrode which will apply less force when the MEMS switch is actuated than areas of the moveable electrode under which the electrically active contact structures are arranged. For example, in some embodiments, the electrically inactive contact structures may be arranged closer to the edge of the moveable electrode than the electrically active contact structures. In other embodiments, the electrically active contact structures may be arranged closer to the edge of the moveable electrode than the electrically inactive contact structures.

A switch array including a plurality of the MEMS switches is contemplated as well. In particular, a switch array is provided which includes at least one plate-based MEMS switch having a multiple of three support arms extending from a moveable electrode which is spaced above a fixed electrode. The plate-based MEMS switch may include any of the configurations of the MEMS switch described herein. For example, the MEMS switch may include a plurality of contact structures having portions extending into a space between the fixed electrode and the moveable electrode. In some cases, the relative arrangement of the plurality of contact structures may be congruent among three regions of the MEMS switch which collectively comprise the entirety of fixed electrode and entirety of the moveable electrode. In other embodiments, the relative arrangement of the plurality of contact structures may not be congruent among the three regions of the MEMS switch.

There may be several advantages to fabricating a plate-based MEMS switch with the configurations described above. In particular, a more stable plate-based MEMS switch may be fabricated as compared to conventional designs due to inclusion of a multiple of three support arms uniformly spaced about the moveable electrode and a plurality of contact structures interposed between the moveable electrode and fixed electrode. Such stability may aid in preventing the moveable electrode from collapsing or bending onto the underlying gate electrode, reducing the likelihood of the switch of malfunctioning. As a result, the stability of the plate-based MEMS switch described herein may allow an electrode to be moved uniformly in a vertical direction. Preventing the moveable electrode from collapsing or bending onto the underlying gate electrode may be particularly evident in embodiments in which the arrangement of contact structures are congruent relative to different regions of the moveable electrode.

In some configurations, the MEMS switch described herein may additionally offer manners in which to improve the opening reliability of the switch. In particular, electrically inactive contact structures within the MEMS switch described herein may include materials which are less susceptible to stiction. In addition, contact structures may be arranged congruent relative to different regions of the moveable electrode causing a slight variation of contact forces on the structures when an actuation voltage is applied. A slight variation of contact forces may allow contact structures to be released at different times, reducing the energy needed to release all contact structures and thereby increasing the opening reliability of the switch.

BRIEF DESCRIPTION OF THE DRAWINGS

Other objects and advantages of the invention will become apparent upon reading the following detailed description and upon reference to the accompanying drawings in which.

Figure 1:
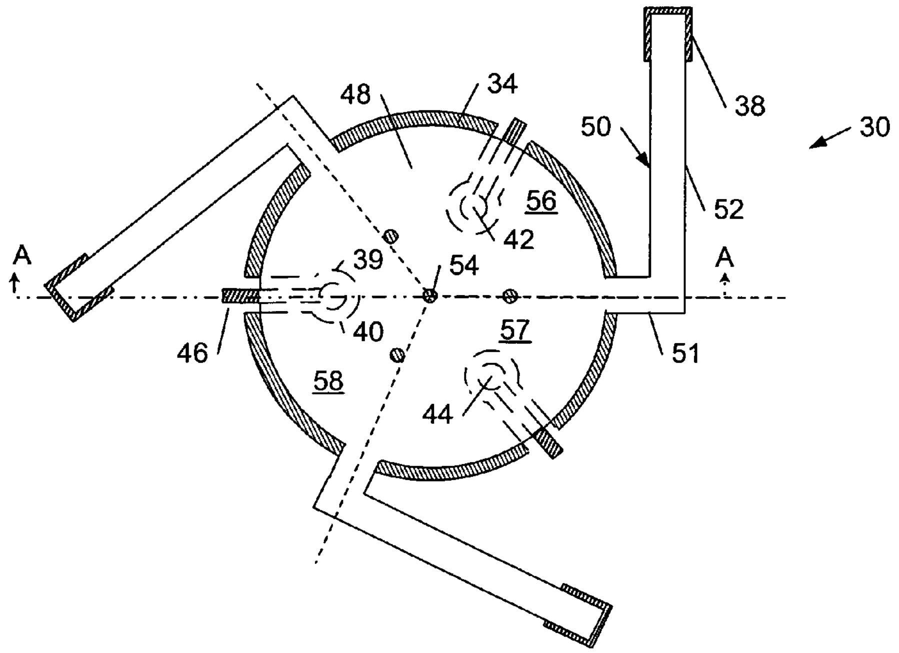
FIG. 1 depicts a plan view of an exemplary configuration of a plate-base MEMS switch.

While the invention may include various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2A:
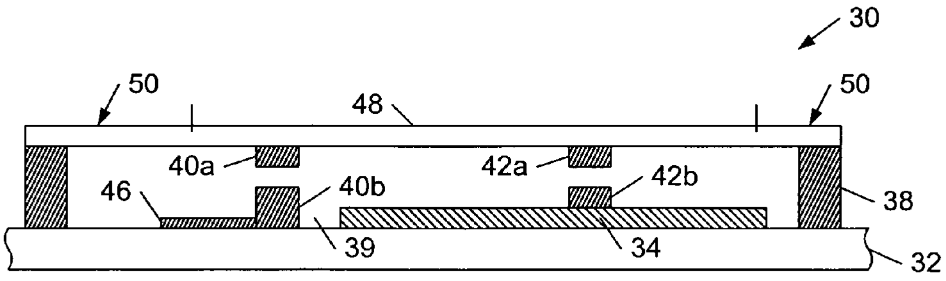
FIG. 2*a* depicts a cross-sectional view of the plate-based MEMS switch illustrated in FIG. 1 taken along line AA.
Figure 2B:
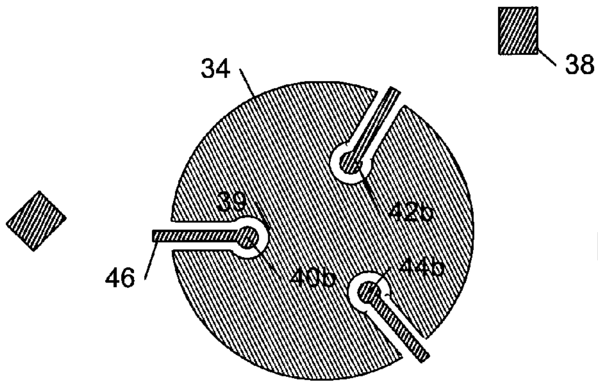
FIG. 2*b* depicts a plan view of the first level of components within the plate-based MEMS switch illustrated in FIG. 1.

Turning to the drawings, exemplary configurations of plate-based microelectromechanical switches are shown. In particular, FIGS. 1 and 2*a*–2*c* illustrate MEMS switch 30 with moveable electrode 48 arranged above fixed electrode 34. As noted above, the terms "MEMS switch" and "microelectromechanical switch" are used interchangeably herein, although the acronym "MEMS" does not correspond exactly. FIG. 1 is a plan view of MEMS switch 30 and FIG. 2*a* is a cross-sectional view of MEMS switch 30 taken along line AA of FIG. 1. FIG. 2*b* illustrates a plan view of the lower components of MEMS switch 30 (i.e., fixed electrode

Figure 2C:
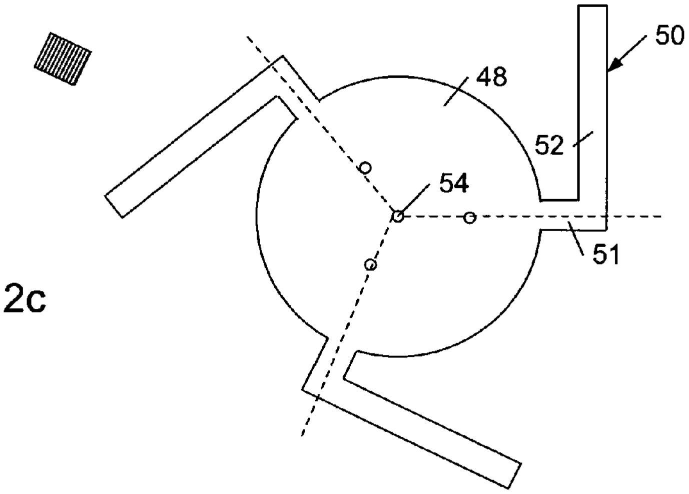
FIG. 2*c* depicts a plan view of the second level of components within the plate-based MEMS switch illustrated in FIG. 1.

34, support via 38, contact sub-structures 40*b*, 42*b* and 44*b*, and signal wires 46) and FIG. 2*c* illustrates a plan view of the upper components of MEMS switch 30 (i.e., moveable electrode 48 and support arms 50). FIGS. 1 and 2*a*–2*c* are discussed concurrently in reference to the configuration of MEMS switch 30. It is noted that the MEMS switch described herein is not restricted to the configuration of MEMS switch 30. Other exemplary configurations of plate-based MEMS switches including components having alternative configurations to MEMS switch 30 are described in more detail below in reference to FIGS. 3–23. It is noted that the images depicted in FIGS. 1–23 are not drawn to scale. In particular, some features of the MEMS switches shown may be disproportionately sized relative to other features in the interest to emphasize particular aspects of the switches.

As shown in FIGS. 1 and 2*c*, MEMS switch 30 includes support arms 50 spaced about the periphery of moveable electrode 48. Support arms 50 extend from moveable electrode 48 to support vias 38 which are coupled to substrate 32 upon which fixed electrode 34 is formed. One of support vias 38 is shown in FIG. 2*a* to the left of signal wire 46 extending from contact structure 40. Another of support vias 38 is shown to the right of fixed electrode 34 in FIG. 2*a*, while yet the third support via is not shown in the cross-sectional view of FIG. 2*a*. As discussed in more detail below, support arms 50 and moveable electrode 48 may, in some embodiments, include the same material. As such, support arms 50 may be contiguous extensions of moveable electrode 48 in some embodiments. Consequently, different cross-hatched patterns are not used to differentiate the components. Dotted lines, however, are used in FIG. 2*a* to indicate the approximate location at which support arms 50 extend from moveable electrode 48. The dotted lines are merely used to illustrate the relative position of the components and, therefore, are not part of MEMS switch 30.

Moveable electrode 48 is shown in FIGS. 1 and 2*c* including holes 54, which may allow chemical access to the underside of the electrode during fabrication as well as allow air to escape during actuation. The number, size, and arrangement of holes 54 in moveable electrode 48 are not restricted to the configuration shown in FIGS. 1 and 2*c*. In particular, moveable electrode 48 may include any number of holes of any size and the holes may be arranged in any manner. Holes 54 are not shown in the cross-sectional view of MEMS switch 30 in FIG. 2*a* to simplify the drawing. FIG. 1 illustrates fixed electrode 34 as having a larger diameter than moveable electrode 48. Such a configuration may be particularly advantageous when fabricating MEMS switch 30 with conformal deposition techniques. In particular, fabricating moveable electrode 48 to have a smaller diameter than fixed electrode 34 may advantageously allow moveable electrode 48 to be formed without a peripheral lip. In yet other embodiments, however, fixed electrode 34 may be formed to have substantially similar or smaller dimensions than moveable electrode 48. In any case, the diameter of fixed electrode and moveable electrode may be between approximately 100 microns and approximately 1000 microns. Exemplary methods for fabricating MEMS switches are described in more detail below in reference to FIGS. 12–23.

MEMS switch 30 further includes contact structures 40, 42, and 44 having portions extending into the space between fixed electrode 34 and moveable electrode 48. In general, the MEMS switch provided herein may include any number of contact structures between moveable electrode 48 and fixed electrode 34. In some embodiments, however, it may be advantageous to provide at least three contact structure therebetween and may, in some cases, be further advantageous to limit the number of contact structures to three. In particular, three contact structures may form a plane upon which moveable electrode 48 may be uniformly supported, thereby preventing moveable electrode 48 from warping, bending, or collapsing onto fixed electrode 34. As noted below, contact structures may be arranged at any position between moveable electrode 48 and fixed electrode 34. In some embodiments, however, it may be advantageous for a MEMS switch to be absent of a contact structure between a center point of the moveable electrode and the fixed electrode. In particular, a single contact structure centered relative to a center of a moveable electrode or a plurality of contact structures arranged very close to a center of a moveable electrode may allow the electrode to bend or collapse onto the underlying fixed electrode.

As shown in FIG. 2*a*, contact structures 40 and 42 may include contact sub-structures 40*a* and 42*a* formed directly beneath moveable electrode 48 and contact sub-structures 40*b* and 42*b* formed upon substrate 32 isolated from fixed electrode 34. In alternative embodiments, one or both of contact sub-structures 40*b* and 42*b* may be formed upon signal wires 48. In a preferred embodiment, at least one of contact sub-structures 40*a*, 40*b*, 42*a* and 42*b* may be dimensioned to extend into the space between fixed electrode 34 and moveable electrode 48. In this manner, moveable electrode 48 may be prevented from coming into contact with fixed electrode 34 when an actuation voltage is applied. In some cases, one or more of contact sub-structures 40*a*, 40*b*, 42*a* and 42*b* may have a different thickness than the others. In yet other embodiments, contact sub-structures 40*a*, 40*b*, 42*a* and 42*b* may have substantially similar thicknesses. In addition, contact sub-structures 40*a*, 40*b*, 42*a* and 42*b* may, in some embodiments, have substantially similar lateral dimensions such that the structures are of similar shape and/or size. In yet other embodiments, one or more of contact sub-structures 40*a*, 40*b*, 42*a* and 42*b* may be of different shapes and/or sizes.

Although not depicted in FIGS. 1 and 2*a*–2*c*, contact structure 44 may include a similar arrangement as contact structures 40 and 42. In particular, contact structure 44 may, in some embodiments, include a contact sub-structure formed upon substrate 32 isolated from fixed electrode 34 and another contact sub-structure formed directly beneath moveable electrode 48. In this manner, each of contact structures 40, 42, and 44 may include a set of contact sub-structures. In other embodiments, one or more of contact structures 40, 42 and 44 may only include one contact sub-structure formed upon substrate 32. More specifically, one or more of contact sub-structures 40*a*, 42*a* and 44*a* may be omitted from MEMS switch 30. In such cases, moveable electrode 48 may come into direct contact with contact sub-structures 40*b*, 42*b* and/or 44*b* when an actuation voltage is applied to fixed electrode 34. In some embodiments, any of contact sub-structures 40*a*, 42*a*, 44*a*, 40*b*, 42*b* and 44*b* may include more than one contact features or bumps. In some cases, the multiple structures of contact sub-structures 40*a*, 42*a*, 44*a*, 40*b*, 42*b* or 44*b* may be wired in parallel to reduce the combined resistance.

In any case, contact structures 40, 42 and 44 may be coupled to signal wires 46. Signal wires 46 may be configured to pass or receive current, such as radio frequency (RF) signals, conducted through contact structures 40, 42 and 44. As such, signal wires 46 may be coupled to signal input and output terminals. In some embodiments, one or more of signal wires 46 may not be coupled to signal input or output terminals. In general, contact structures which are coupled to signal wires which are in turn coupled to signal input or output terminals may be referred to as "electrically active" contact structures. In contrast, contact structures which are coupled to signal wires which are not coupled to signal input or output terminals may be referred to as "electrically inactive" contact structures. Similar distinctions may be made in reference to support arms 50 in regard to whether support vias 38 are coupled to signal input or output terminals.

Fixed electrode 34 includes cutout portions 39 around signal wires 46 and contact structures 40, 42 and 44 to isolate the contact pads and wiring. In particular, fixed electrode 34 includes cutout portions 39 having configurations which follow the contour of signal wires 46 and contact structures 40, 42 and 44 as shown in FIGS. 1 and 2*b*. More specifically, fixed electrode 34 is configured to have edges within cutout portions 39 which are spaced a substantially uniform distance from signal wires 46 and contact structures 40, 42 and 44. In other embodiments, fixed electrode 34 may be configured to have edges which are not spaced a uniform distance around signal wires 46 and contact structures 40, 42 and 44. In any case, fixed electrode 34 may additionally or alternatively include a central cutout-portion. In other embodiments, fixed electrode 34 may be segmented into two or more electrodes. Consequently, the MEMS switch provided herein may include different configurations of fixed electrodes.

Figure 3:
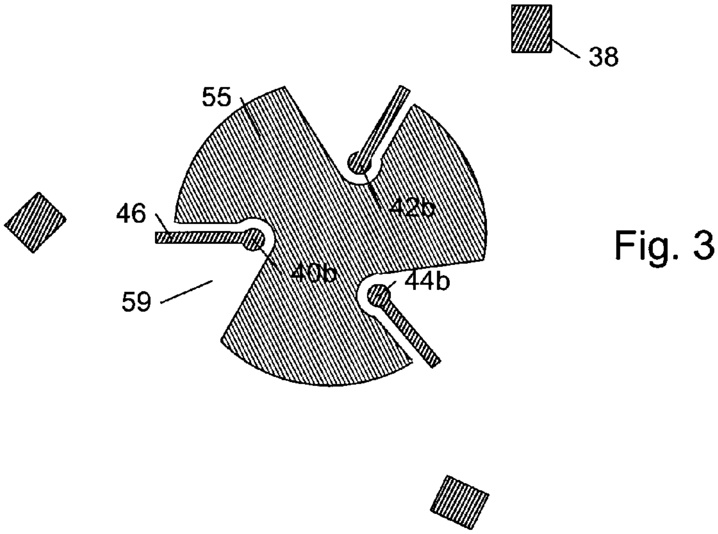
FIG. 3 depicts a plan view of an alternative configuration for the first level of components within the plate-based MEMS switch illustrated in FIG. 1.

FIG. 3 illustrates an exemplary configuration of a fixed electrode having different cutout portion shapes than cutout portions 39 shown in FIGS. 1 and 2*b*. In particular, FIG. 3 illustrates a plan view of the lower components of a MEMS switch with fixed electrode 55 having edges characterizing cutout portions 59. As shown in FIG. 3, fixed electrode 55 is configured such that cutout portions 59 span across relatively large regions of an underlying substrate between fixed electrode 55 and signal wires 46. In some embodiments, it may be advantageous to configure fixed electrode 55 to have cutout portions 59 span across regions an underlying substrate which correspond to portions of an overlying moveable electrode which are particularly susceptible to collapsing. For example, an area of a moveable electrode which does not have a support arm aligned along the side of the electrode (the relative configuration of having a support arm aligned along the side of an electrode is described in more detail below in reference to support arms 50) may be more susceptible to collapsing than other areas of the moveable electrode. Configuring fixed electrode 55 to have cutout portions span across regions of an underlying substrate which correspond to such areas of a moveable electrode may advantageously prevent shorting between the two actuating electrodes, improving the reliability of the switch. Although the MEMS switch provided herein is specifically configured to prevent the collapse and/or bending of a moveable electrode relative to a fixed electrode, the configuration of fixed electrode 55 in FIG. 3 may provide a manner in which to avoid having the two electrodes contact in the event a moveable electrode does bend in the MEMS switch configuration provided herein.

One disadvantage of enlarging the cutout portions of a fixed electrode around signal wires 46 and contact structures 40, 42 and 44 is that a larger actuation voltage may be needed to bring a moveable electrode down in contact with contact structures 40, 42 and 44 for a given amount of contact force. As noted above, increasing the actuation voltage of a switch may be undesirable in some cases. As such, in some embodiments, the fixed electrode 48 may be configured such that the actuation voltage of the switch may be maintained under a particular specification. Consequently, the configuration of the fixed electrode included in the MEMS switch provided herein is not restricted to the configurations shown in FIGS. 1 and 3. In particular, the fixed electrode included in the MEMS switch provided herein may be configured to have any size and shape of cutout portions around signal wires 46 and contact structures 40, 42 and 44, including larger and smaller spaces extending from one or both sides of signal wires 46 as well as from portions of contact structures 40, 42 and 44 as compared to the configurations shown in FIGS. 1 and 3.

Figure 7:
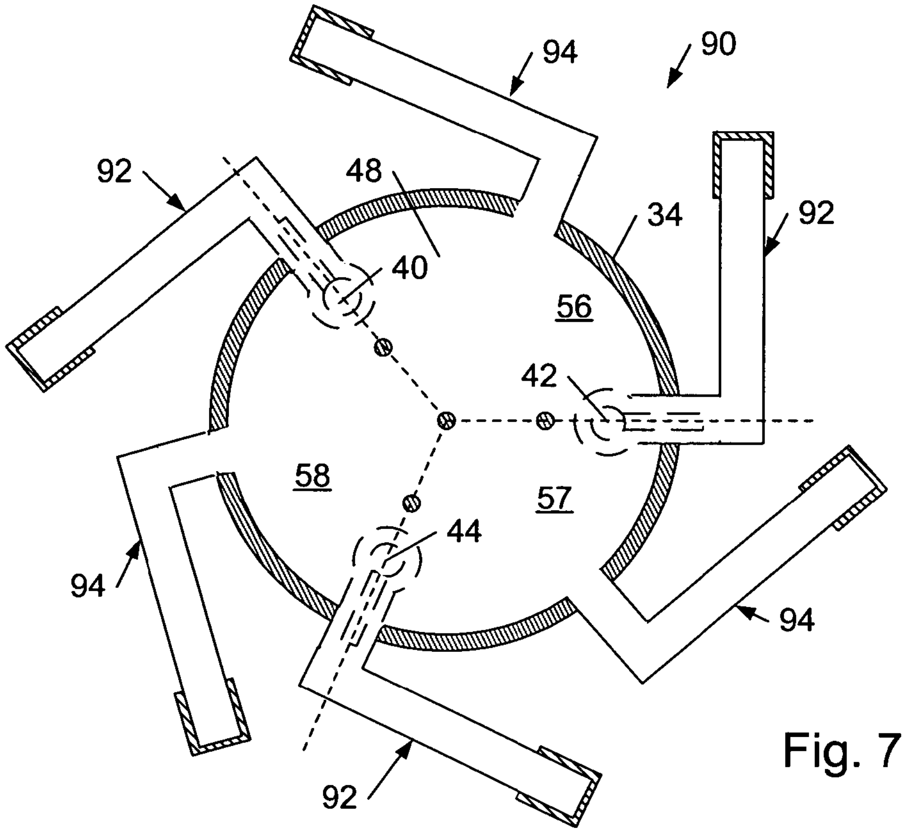
FIG. 7 depicts a plan view of another exemplary configuration of a plate-based MEMS switch which includes six support arms.

Although support arms 50 in FIGS. 1 and 2*c* are shown uniformly spaced about the periphery of moveable electrode 48, the support arms may be arranged along any peripheral location of the moveable electrode. In some embodiments, however, it may be advantageous to space support arms 50 uniformly about moveable electrode 48. In particular, uniformly spaced support arms may allow moveable electrode 48 to be uniformly supported such that peripheral regions of moveable electrode 48 may not be more susceptible to bending or collapsing onto fixed electrode 34 versus other peripheral regions of the electrode. In any case, although MEMS switch 30 is shown to include three support arms in FIGS. 1 and 2*c*, MEMS switch 30 may include any number of support arms. In some embodiments, it may be advantageous for MEMS switch 30 to include a single set of support arms consisting of a multiple of three support arms to provide structural stability to the moveable electrode. For example, MEMS switch 30 may include three, six or nine support arms spaced about the periphery of moveable electrode 48. An exemplary configuration of a plate-based MEMS switch with six spaced support arms is shown in FIG. 7 and described in more detail below. Multiples of three support arms uniformly spaced around the periphery of moveable electrode 48 may advantageously offer a manner in which to stabilize moveable electrode 48, both laterally and vertically relative to fixed electrode 34. In particular, three support arms may act as a tripod, defining a plane by which the electrode is held and moved. Additional support arms in multiples of three may provide further support to such tripod structure.

In some cases, however, additional support arms may cause an uneven distribution of force on contact structures 40, 42 and 44 when MEMS switch 30 is actuated, disadvantages of which are described in more detail below in reference to the arrangement of contact structures 40, 42 and 44. In particular, the slightest variation in the height of support vias 38 when more than three support arms are used within MEMS 30 may cause moveable electrode 48 to warp or bend in order to be supported by all of the support arms. Warpage may undesirably increase the likelihood of moveable electrode 48 coming into contact with fixed electrode 34, affecting the reliability of the switch. A switch with only three support arms, however, defines only one plane by which to support moveable electrode 48 and, therefore, can afford to have variations of height within support vias 38 without causing an uneven distribution of force on contact structures 40, 42 and 44. As such, in some embodiments, it may be advantageous to limit the number of support arms extending from moveable electrode 48 to three.

In addition, the lengths of support arms 50 may be shorter in embodiments in which only three support arms are included within a MEMS switch. In particular, in order to maintain switching voltage characteristics (i.e., actuation voltage) of switch 30, the length of the support arms may increase as the number of support arms that extend from moveable electrode 48 increases. Lengthening support arms

50, however, may undesirably increase the size of MEMS switch 30. In addition, increasing the number of support arms may increase the number of support vias formed upon substrate 32, undesirably increasing the thermo-mechanical interactions between support vias 38 and substrate 32 and moveable electrode 48. In general, support vias 38 and moveable electrode 48 may include different materials than substrate 32. For example, support vias 38 and moveable electrode 48 may include gold and substrate 32 may include silicon. Other exemplary materials that may be alternatively or additionally used for support vias 38, moveable electrode 48 and/or substrate 32 are noted below in reference to FIGS. 12–23 in which a fabrication process of the MEMS switch provided herein is described. In some cases, moveable electrode 48 may include a different material than support vias 38 as well as substrate 32.

In general, the MEMS switch will be subject to different temperatures during manufacture and in use. The variation of materials between the components may cause support vias 38 and moveable electrode 48 to have different coefficients of thermal expansion than substrate 32. As a consequence, support vias 38 may expand at a different rate than substrate 32, causing stress at the interface of the components. In some cases, such stress may hinder the mobility of support arms 50 coupled to support vias 38 and, consequently, hinder moveable electrode 48 to uniformly move or move flatly toward fixed electrode 34 during actuation. In particular, the stress generated at the interface of support vias 38 and substrate 32 may cause moveable electrode 48 to warp as the moveable electrode attempts to minimize stress in all of the support arms. In some cases, support arms 50 may include a different material than support vias 38 causing additional interfacial stresses with which to cause moveable electrode 48 to warp. In addition or alternatively, the thermal expansion or contraction of moveable electrode 48 itself may contribute warping of the moveable electrode. In particular, the thermal expansion or contraction of moveable electrode 48 relative to support vias 38 may increase the lateral force on the moveable electrode, causing the electrode to warp. In any case, increasing the number of support vias increases the stress at the interface of substrate 32 and the total force on moveable electrode 48. As a result, increasing the number of support arms may be more likely to impair the movement of moveable electrode 48.

Consideration of the objective to move moveable electrode 48 relative to fixed electrode 34 as well as the thermo-mechanical interactions between support vias 38 and substrate 32 may dictate the shape and/or layout configuration of support arms 50 relative to moveable electrode 48. More specifically, the hindrance of the mobility of moveable electrode 48 due to the stress caused by the variance of the thermal expansion between support vias 38 and substrate 32 as well as the lateral force imposed on moveable electrode 48 due to the thermal expansion and/or contraction of the electrode may be lessened when portions of support arms 50 are arranged along a side of moveable electrode 48. FIGS. 1 and 2*c* illustrate support arms 50 having first portion 51 extending radially from moveable electrode 48 and second portion 52 extending from first portion 51 at a angle greater than approximately 0 degrees. In this manner, support arms 50 may be arranged along a side of moveable electrode 48. Such a configuration may advantageously allow support arms 50 to twist in response to a force imposed on moveable electrode 48. For example, the configuration of support arms 50 may allow the arms to twist in response to a force induced by the actuation of fixed electrode 34 and/or by the variance of the thermal expansion of moveable electrode 48. The twisting action of support arms 50 will absorb the stress induced at the interaction of support vias 38 and substrate 32 such that the support and mobility of moveable electrode 48 may be maintained.

As shown in FIGS. 1 and 2*c*, in some embodiments, second portion 52 may be arranged approximately 90 degrees relative to first portion 51. Such an angle may, in some embodiments, allow the most amount of twisting and, consequently, absorb the most amount of stress induced by the thermo-mechanical interactions between support vias 38 and substrate 32 and moveable electrode 48. Second portion 52 may be arranged at smaller or larger angles relative to first portion 51, however, depending on the dimensions and number of support arms extending from moveable electrode 48. In yet other embodiments, support arms 50 may only include a single portion extending radially from moveable electrode 48. An exemplary configuration of radially arranged support arms is shown in FIG. 5 and described in more detail below. In addition, a plurality of other configurations for moveable electrode 48 and support arms 50 are described in more detail below in reference to FIGS. 4 and 6.

In addition to maintaining moveable electrode 48 at a fixed location both laterally and vertically relative to fixed electrode 34, support arms 50 may serve to pull moveable electrode 48 out of contact with contact structures 40, 42 and 44 when an actuation voltage applied to fixed electrode 34 is released. In some cases, support arms 50 may be specifically configured for both functions. In particular, support arms 50 may be dimensioned such that moveable electrode 48 does not collapse upon fixed electrode 34 and reliably opens when an actuation voltage applied to fixed electrode 34 is released. For example, in some cases, support arms 50 may include lengths between approximately 100 microns and approximately 1000 microns or, more specifically, approximately 4 to approximately 8 times longer than the width of support arms 50. Longer or shorter lengths for support arms 50 may be used, however, depending on the size of moveable electrode 48 and the number of support arms extending from the electrode.

As noted above, support arms 50 with shorter lengths may advantageously reduce the size of MEMS switch 30. In addition, shorter lengths may offer more stability to moveable electrode 48 and, therefore, may be more likely to prevent moveable electrode 48 from collapsing onto fixed electrode 34. Larger lengths, however, may allow support arms 50 more flexibility to twist and, consequently, may be more likely to absorb the thermo-mechanical stress incurred at the interface of support vias 38 and substrate 32. In any case, support arms 50 may, in some embodiments, include substantially similar lengths. A similar-length configuration may offer greater stability to moveable electrode 48 and allow the electrode to move more uniformly toward fixed electrode 34 during actuation. Alternatively, one or more of support arms 50 may include a different length than the others.

In some cases, support arms 50 may include widths between approximately 25 microns and approximately 100 microns. Larger or smaller widths, however, may be used, depending on the size of moveable electrode 48 and the number of support arms extending from the electrode. Smaller widths may advantageously reduce the actuation voltage needed to move moveable electrode 48, but larger widths may offer more stability for preventing moveable electrode 48 from collapsing onto fixed electrode 34. In some embodiments, the width of support arms 50 may be proportional to the size of moveable electrode 48. For example, in embodiments in which the moveable electrode is circular, support arms 50 may include widths between approximately 5% and approximately 20% of the diameter of the moveable electrode. In addition or alternatively, support arms 50 may include a variation of widths. For instance, first portion 51 may have a width up to or greater than twice the width of second portion 52. Such a configuration may allow support arms to provide greater stability to moveable electrode 48 while still allowing second portions 52 flexibility to twist. As with the lengths of support arms 50, support arms 50 may, in some embodiments, include substantially similar widths. Alternatively, one or more of support arms 50 may include a different width than the others. In yet other embodiments, the widths of first portion 51 and/or second portion 52 may respectively vary along the length of such portions.

The thickness of support arms 50 may generally be between approximately 2 microns and approximately 10 microns, although larger or smaller thicknesses may be used depending on the size of moveable electrode 48 and the lengths and widths of support arms 50. In general, thicker support arms provide more stability in preventing moveable electrode 48 from collapsing onto fixed electrode 34, but reduce the flexibility to twist and, therefore, reduce the ability to absorb the thermo-mechanical stress incurred at the interface of support vias 38 and substrate 32. In addition, thicker support arms may necessitate a larger actuation voltage to move moveable electrode 48 such that contact structures 40, 42 and 44 are brought into contact. In any case, support arms 50 may, in some embodiments, include substantially similar thicknesses. Alternatively, one or more of support arms 50 may include a different thickness than the others. As noted below in reference to the exemplary methods for fabricating a MEMS switch, moveable electrode 48 may, in some embodiments, be thicker than support arms 50. More specifically, the average thickness of moveable electrode 48 may be approximately 50% to approximately 100% thicker than support arms 50. In yet other embodiments, moveable electrode 48 and support arms 40 may include the same thickness.

In general, the areal dimensions of moveable electrode 48 may depend on the areal dimensions of the fixed electrode, the number of contact structures interposed between the moveable electrode and fixed electrode and the actuation voltage used to operate the switch. In general, a moveable electrode covering a larger area will induce greater contact force on underlying contact structures. As noted below, a greater contact force may advantageously break through contamination on the contact structures, reducing contact resistance and stiction. On the other hand, larger areal dimensions of moveable electrodes produce larger devices, which is contrary to the industry objective to produce smaller components. As such, there is a trade-off in sizing moveable electrode 48. In general, the size of moveable electrode 48 may be optimized to meet the design specifications of a switch, but may generally occupy an area between approximately 0.01 $mm^2$ and approximately 1.0 $mm^2$. For example, in an embodiment in which moveable electrode 48 is circular as shown in FIGS. 1 and 2*c*, moveable electrode 48 may have a diameter between approximately 100 microns and approximately 1000 microns.

FIGS. 1 and 2*c* illustrate moveable electrode 48 having a circular configuration, but moveable electrode 48 is not restricted to such a shape. In fact, moveable electrode 48 may include any shape. In some embodiments, it may be particularly advantageous to have moveable electrode 48 in a shape which may be divided into three regions having substantially similar shapes and areas. In particular, a shape which is divisible into three regions having substantially similar shapes and areas may be advantageous for arranging contact structures uniformly under the moveable electrode. In addition, a shape which is evenly divisible into three regions may offer a layout which allows the arrangement of the contact structures to be easily determined. The circular configuration of moveable electrode 48 in FIGS. 1 and 2*c*, for example, is a shape which may be divided into three symmetric regions, namely regions 56–58.

In some embodiments, regions 56–58 may be defined by boundaries extending from each of support arms 50 to a center point of moveable electrode 48 as shown by the dotted lines in F*ig*. 1. The dotted lines are merely used to illustrate a possible segregation of moveable electrode 48 and, therefore, are not part of MEMS switch 30. Regions 56–58 may be defined by boundaries other than those illustrated in FIG. 1. For example, regions 56–68 may alternatively be defined by boundaries extending from a point between each of the support arms to a center point of moveable electrode 48 or any other boundaries which divide moveable electrode 48 into three symmetric shapes. In any case, it is noted that the symmetry of regions 56–58 do not include support arms 5O although support arms 50 may include the same material as moveable electrode 48 and be a single contiguous structure with moveable electrode 48. In the interest to simplify the distinction between moveable electrode 48 and support arms 50, the shape of moveable electrode 48 as referred to herein may generally refer to the shape of the structure without support arms 50.

Figure 4:
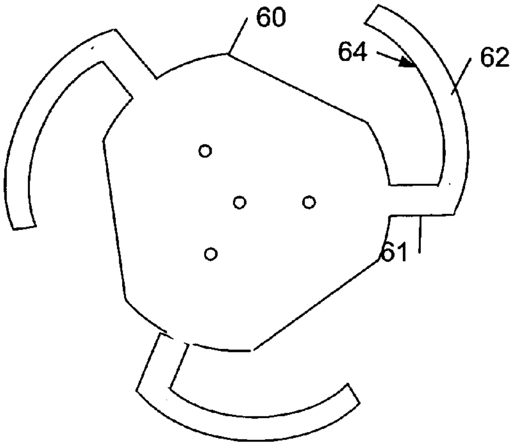
FIG. 4 depicts a plan view of an alternative configuration for the second level of components within the plate-based MEMS switch illustrated in FIG. 1.
Figure 5:
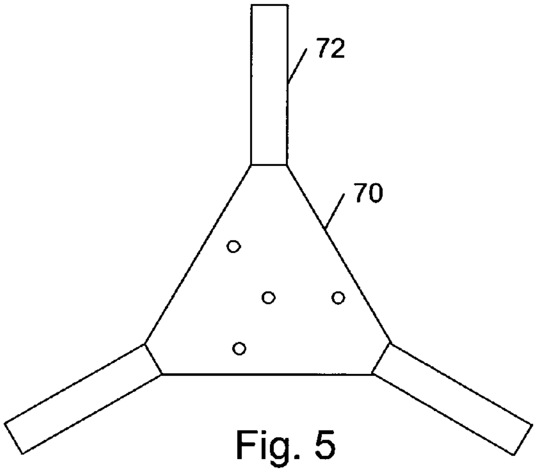
FIG. 5 depicts a plan view of yet another alternative configuration for the second level of components within the plate-based MEMS switch illustrated in FIG. 1.
Figure 6:
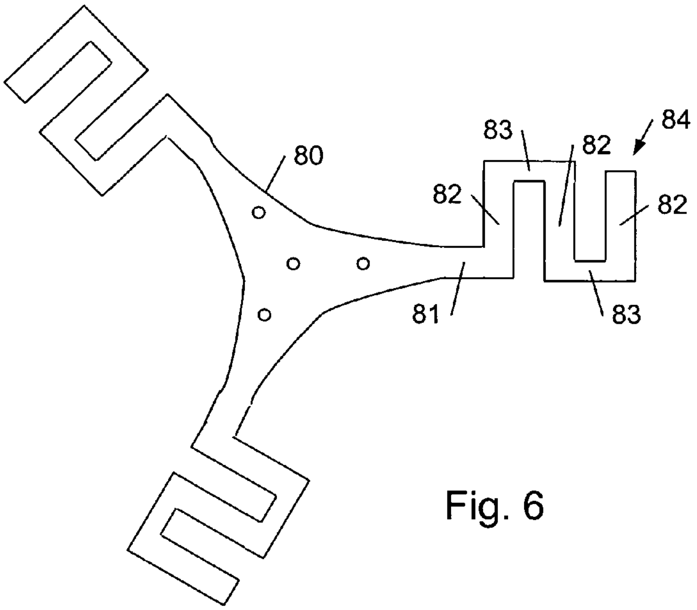
FIG. 6 depicts a plan view of yet another alternative configuration for the second level of components within the plate-based MEMS switch illustrated in FIG. 1.

Alternative configurations of moveable electrodes that may be included within MEMS switch 30 are illustrated in FIGS. 4–6. In particular, FIG. 4 illustrates a plan view of moveable electrode 60 having a truncated circular shape. FIG. 5 illustrates a plan view of moveable electrode 70 having a triangular shape and FIG. 6 illustrates a plan view of moveable electrode 80 having a truncated triangle shape, which may alternatively be referred to herein as a trefoil shape or three-pointed star. As noted above, the MEMS switch provided herein may include a moveable electrode of any shape and, thus, is not restricted to the shapes illustrated in FIGS. 2*c* and 4–6. In some embodiments, the shape of fixed electrode 34 may be substantially similar to the shape of moveable electrode 48 and, as such, may be formed to have the shape including but not limited to the shapes described in reference to FIGS. 4–6. Having a shape similar to moveable electrode 48 may advantageously reduce the area occupied by MEMS switch 30. In yet other cases, the shape of fixed electrode 34 may have a substantially different shape than moveable electrode 48. For example, fixed electrode 34 may be circular regardless of the shape of moveable electrode 48. Alternatively, fixed electrode 34 may be of a different shape, such as but not limited to the shapes described in reference to FIGS. 4–6.

As shown in FIGS. 4–6, MEMS switch 30 may include alternative configurations of support arms as well as different configurations of moveable electrodes. The configurations of the support arms illustrated in FIGS. 4–6 are discussed in more detail below. Although the configurations of support arms illustrated in FIGS. 2*c* and 4–6 are each shown in relation to different configurations of moveable electrodes, the configurations are not necessarily mutually exclusive. In particular, the MEMS switch provided herein may include any combination of configurations of moveable electrodes and support arms described herein, including but not limited to the configurations illustrated in FIGS. 2*c* and 4–6.

FIG. 4 illustrates support arms 64 having first portion 61 extending radially from moveable electrode 60 and second portion 62 extending from first portion 61 and concentrically about moveable electrode 60. The configuration of support arms 64 may advantageously reduce the size of a MEMS switch which includes such a configuration, while still offering the benefit of absorbing thermo-mechanical stresses which may be induced between support vias supporting the support arms and an underlying substrate. In particular, the configuration of support arms 64 may advantageously offer a configuration which allows the arms to twist such that moveable electrode 60 may be moved in a uniform fashion. Although support arms 64 are illustrated in FIG. 4 as extending from the peripheral portions of moveable electrode 60 comprising an arc, support arms 64 may alternatively extend from the flat peripheral portions of moveable electrode 60.

FIG. 5 illustrates an alternative configuration of support arms in which single segments extending radially from a moveable electrode. In particular, FIG. 5 illustrates support arms 72 extend radially from moveable electrode 70 without any additional segments extending therefrom. Although support arms 72 are illustrated in FIG. 5 as extending from the pointed portions of triangular shaped moveable electrode 70, support arms 72 may alternatively extend from the side peripheral portions of moveable electrode 70. FIG. 6 illustrates yet another configuration of supports arms which the MEMS device provided herein may include. In particular, FIG. 6 illustrates support arms 84 having a meandering configuration extending from moveable electrode 80. More specifically, support arms 84 include first portion 81 extending radially from moveable electrode 80, second portions 82 arranged perpendicular to first portion 81, and third portions 83 arranged perpendicular to second portions 82 which are all connected to form a meandering structure. A meandering configuration may advantageously increase the flexibility of support arms 84 to bend and twist relative to the configuration of support arms 50 shown in FIG. 2*c*. Consequently, the configuration of support arms 84 may increase the absorption of thermo-mechanical stresses which may be induced between support vias supporting the support arms and an underlying substrate relative to the configuration of support arms 50 shown in FIG. 2*c*.

As noted above, one of the objectives of the MEMS switch provided herein is to guide the motion of the moveable electrode toward the fixed electrode while preventing the moveable electrode from collapsing onto the fixed electrode. Several support arm configurations have been provided for obtaining such an objective. In some embodiments, the arrangement of the contact structures between the moveable electrode and the fixed electrode may further contribute to such an objective. In particular, the angular position and radial position (definitions of which are described in more detail below) of the contact structures may affect the ability of the MEMS switch to prevent a moveable electrode from collapsing onto a fixed electrode. In addition, the arrangement of contact structures in the MEMS switch provided herein may be optimized to improve the opening and closing reliability while preventing the electrodes from contacting. In particular, the angular position of the contact structures may affect the ability of the moveable electrode to deflect away from a contact structure after an actuation voltage is terminated. In addition, the radial position of the contact structures may affect the force at which moveable electrode is brought into contact with the contact structures at any given actuation voltage.

In some cases, it may be advantageous to provide a sufficient striking force at the contact structures to break though any contamination formed upon the structures. Removal of contamination on the contact structures may advantageously reduce the amount of stiction holding the structures together as well as reduce the resistance of the contact, thereby improving the opening and closing reliability of the switch. As discussed in more detail below, the contact structures of the MEMS switch described herein may be arranged at any angular positions and radial positions with respect to the support arms and the center of the moveable electrode, depending on the design specifications of the switch. In some cases, the arrangement of contact structures may be specifically described relative to regions of the MEMS switch or, more specifically, the moveable electrode as noted below.

FIG. 1 illustrates contact structures 40, 42 and 44 arranged midway between two adjacent support arms. More specifically, FIG. 1 illustrates contact structures 40, 42 and 44 arranged at an angular location which bisects the angular locations of two adjacent support arms. The term "angular location" as used herein may generally refer to the concentric position of a structure about a central axis which is independent of the distance from the structure to the central axis. The bisecting arrangement of contact structures 40, 42 and 44 illustrated in FIG. 1 may be optimal for preventing moveable electrode 50 from bending and/or collapsing, but may be less effective than other arrangements of contact structures for opening the switch when the actuation voltage has been removed. Consequently, contact structures 40, 42 and/or 44 may, in some embodiments, be arranged in alternative angular locations. For example, in some embodiments, contact structures 40, 42 and/or 44 may be arranged at angular locations which are between but do not bisect the angular locations of support arms 50. In other embodiments, contact structures 40, 42 and/or 44 may be arranged at the same angular locations as the angular locations of support arms 50. An exemplary configuration of a MEMS switch having contact structures and support arms arranged at approximately the same angular locations is illustrated in FIG. 7 and described in more detail below.

In general, contact structures may be arranged from an axis which extends through a central point of the moveable electrode by a distance which is between approximately 25% and approximately 100% of the span between the central point axis an edge of the moveable electrode. FIG. 1 illustrates contact structures 40, 42 and 44 arranged approximately midway between the center point and edges of moveable electrode 48. Such an arrangement may be particularly advantageous for preventing moveable electrode 48 from collapsing onto fixed electrode 34. In particular, arranging contact structures 40, 42 and 44 at an approximate midway radial position may counteract the tendencies of the center portion and edge portions of moveable electrode 48 from collapsing (i.e., counteract the tendencies of moveable electrode to collapse concave-up or concave-down). As a result, a MEMS switch having such an arrangement of contact structures may advantageously have a higher actuation voltage tolerance by which to operate the switch. In other embodiments, however, it may be advantageous to position contact structures at locations other than midway between the center point and edges of the moveable electrode as discussed in more detail below in reference to FIG. 7.

In any case, the radial position of contact structures 40, 42 and 44 relative to the central point and edges of moveable electrode 48 may affect the amount of contact force on the structures when an actuation voltage is applied. In some embodiments, an even distribution of contact force may be desirable in switches in which all contact structures are electrically active to insure adequate operation of the switch. More specifically, an even distribution of contact force may insure that contact and release of contact structures 40, 42 and 44 occurs at the same time or is equally likely. In some cases, a substantially even distribution of force may be obtained by arranging the contact structures at the same radial distance from the center point of the moveable electrode. In other embodiments, however, an uneven distribution of force may be desired and, therefore, the contact structures may not be arranged at the same radial distance from the center point of the moveable electrode as described below in reference to FIG. 8.

FIG. 1 illustrates contact structures 40, 42, and 44 in an arrangement which may be particularly advantageous for preventing moveable electrode 48 from collapsing onto fixed electrode 34. In particular, contact structures 40, 42 and 44 are shown arranged each within one of regions 56–58 and uniformly arranged about the center point of moveable electrode 48. As a result, support arms 50 and contact structures 40, 42 and 44 are arranged about substantially the same axis. In other embodiments, contact structures 40, 42 and 44 may not be arranged about the same axis as support arms 50. Exemplary embodiments of MEMS switches with such an arrangement of contact structures are described in more detail below in reference to FIGS. 8 and 9.

As shown in FIG. 1, contact structures 40, 42 and 44 are arranged at substantially similar angular locations relative to the support arms between which each of the contact structures are arranged. In addition, contact structures 40, 42 and 44 are arranged at substantially similar radial positions relative to the central point of moveable electrode 48. As a result, the position of contact structures 40, 42 and 44 within regions 56–58, respectively, are substantially similar. More specifically, contact structures 40, 42 and 44 are arranged such that if regions 56–58 were laid over one another, the center points of the contact structures would be in substantial alignment. In some cases, contact structures 40, 42 and 44 may be arranged such that if regions 56–58 were laid over one another, the center points of each the contact structures would lie within boundaries of all of contact structures 40, 42 and 44. In yet other embodiments, contact structures 40, 42 and 44 may be arranged such that if regions 56–58 were laid over one another, the center points of the contact structures would lie within a characteristic distance of each other, such as less than a width of one of the contact structures 40, 42 and 44. The term "congruent", as used herein, may generally refer to structure layouts exhibiting substantially similar arrangement of structures when the layouts are viewed over one another. As such, the arrangement of contact structures 40, 42 and 44 in FIG. 1 may be referred to as congruent.

It is noted that the discussion of whether the arrangement of contact structures are congruent relative to different regions of a moveable electrode or the MEMS switch itself is independent of the size and shape of the contact structures. In particular, the notion of congruency for the arrangement of the contact structures is directed at the location of the contact structures and, more specifically, the center points of the contact structures relative to regions of the moveable electrode and/or regions of the MEMS switch, rather than the size and shapes of the contact structures relative to each other. As noted above, the term congruent may refer to structure layouts which have center points of structures substantially aligned when portions of a device are laid over one another. As such, "congruent arrangements", as used herein, may include but are not limited to structure layouts which have 1:1 coincidence alignment of the contact structure peripheries. In some embodiments, a congruent arrangement of contact structures may not have any of their peripheries in alignment when laid over one another. As such, the MEMS switch provided herein may include contact structures of different sizes and shapes which are congruently arranged within the switch.

FIG. 7 illustrates an exemplary MEMS switch depicting a variety of alternative configurations relative to MEMS switch 30 described in reference to FIG. 1. For example, FIG. 7 depicts MEMS switch 90 with six arms uniformly spaced about the periphery of moveable electrode 48. In particular, FIG. 7 illustrates MEMS switch 90 including additional support arms 94 arranged along the periphery of moveable electrode 48 interposed between support arms 92. In some cases, additional support arms 94 may have substantially similar lengths and widths as support arms 92 as shown in FIG. 7. In other embodiments, however, additional support arms 94 may have substantially different lengths and/or widths than support arms 92. FIG. 7 further illustrates contact structures 40, 42 and 44 interposed between fixed electrode 34 and moveable electrode 48 at different angular locations and radial positions relative to MEMS switch 30 shown in FIG. 1. In general, contact structures 40, 42 and 44 may be substantially similar to the contact structures described in reference to FIGS. 1–2*c* and, consequently, have the same reference numbers as those components. In addition, moveable electrode 48 and fixed electrode 34 may be substantially similar to the moveable and fixed electrode described in reference to MEMS switch 30 in FIG. 1 or the alternative configurations discussed in reference to FIGS. 4–6 and, therefore, have the same reference numbers as those components.

FIG. 7 illustrates each of contact structures 40, 42 and 44 aligned between one of support arms 92 and a central axis of moveable electrode 48. In other words, FIG. 7 illustrates contact structures 40, 42 and 44 at substantially similar angular locations as support arms 92. In other embodiments, contact structures 40, 42 and 44 may be arranged at substantially similar angular locations as additional support arms 94. Such an angular position of contact structures 40, 42 and 44 may advantageously improve the opening effectiveness of MEMS switch 90 relative to MEMS switch 30. In particular, contact structures 40, 42 and 44 are in a position which may optimize the transmission of the spring force within support arms 92 and moveable electrode 48 to disengage contact structures 40, 42 and 44.

A drawback to the angular position of contact structures 40, 42 and 44 in FIG. 7 is a MEMS switch may be less effective at preventing a moveable electrode from bending or collapsing, particularly at high actuation voltages and/or when the switch includes a relatively small number of support arms such as in MEMS switch 30 of FIG. 1. MEMS switch 90 in FIG. 7, however, includes additional support arms 94 interposed between support arms 92, which may advantageously provide additional support to moveable electrode 48 for preventing bending and twisting thereof. As a result, the angular position of contact structures 40, 42 and 44 in MEMS switch 90 may not increase the likelihood of moveable electrode 48 from bending and collapsing onto fixed electrode 34. In other cases, the angular placement of contact structures 40, 42 and 44 in FIG. 7 may not increase the likelihood of moveable electrode 48 from bending or collapsing in embodiments in which fewer support arms are arranged about the electrode.

In addition to changing the angular location of contact structures 40, 42 and 44, FIG. 7 illustrates contact structures 40, 42 and 44 closer to the edges of moveable electrode 48 than the center point of moveable electrode 48. In particular, FIG. 7 illustrates contact structures 40, 42 and 44 arranged from the center point of moveable electrode by a distance which is approximately 75% of the span between the center point and the edges of moveable electrode 48. Such a radial position of a contact structure may induce greater contact forces on the contact structure relative to a position closer to a central axis of the moveable electrode when an actuation voltage is applied to fixed electrode 34. As noted above, greater contact forces may be advantageous for breaking through contamination on the contact structures to reduce the stiction between the structures. Positioning contact structures 40, 42 and 44 closer the edges of moveable electrode 48 may advantageously increase the force on the contact structures without having to increase the actuation voltage to operate the MEMS switch.

Although the radial and angular positions of contact structures 40, 42 and 44 in FIG. 7 have been changed relative to the positions of the contact structures in FIG. 1, the arrangement of contact structures 40, 42 and 44 are considered congruent, as defined above. In particular, if regions 56–58 were laid over one another, the center points of contact structures 40, 42 and 44 would be in substantial alignment and, therefore, the arrangement of contact structures 40, 42 and 44 are congruent. As noted above, although contact structures 40, 42 and 44 are shown to have similar shape and size, the contact structures are not restricted to such uniformity. In particular, one or more of contact structures 40, 42 and 44 may have a shape or size different than the ones shown in FIG. 7 and still be considered congruent.

Figure 8:
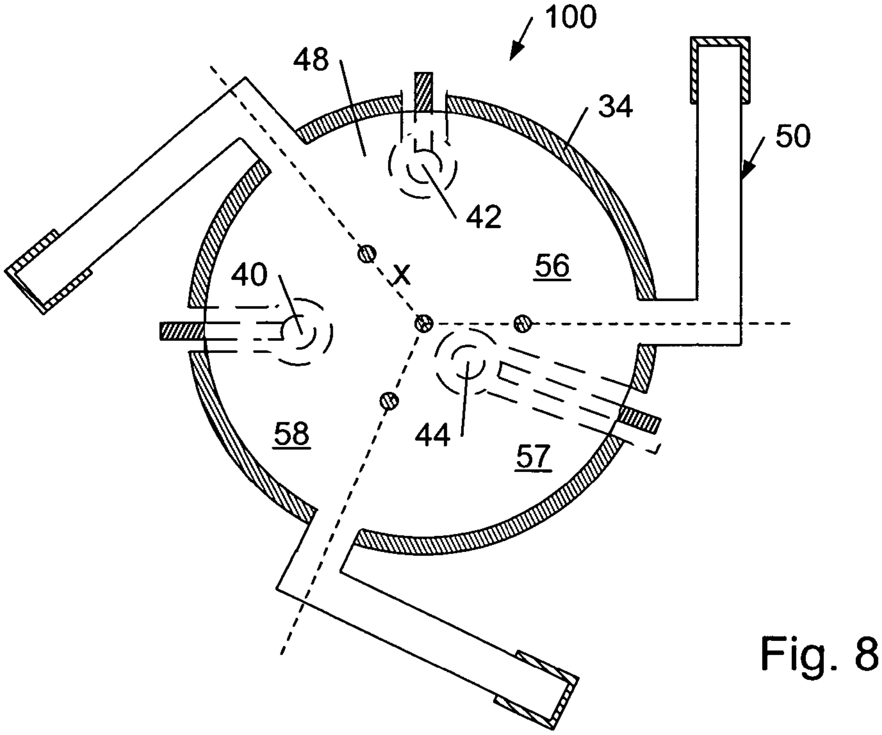
FIG. 8 depicts a plan view of yet another exemplary configuration of a plate-based MEMS switch which has contact structures concentrically arranged about a different axis than the support arms.

FIG. 8 illustrates yet another exemplary MEMS switch depicting an alternative configuration relative to MEMS switch 30 described in reference to FIG. 1. In particular, FIG. 8 depicts MEMS switch 100 having contact structures 40, 42 and 44 arranged concentrically about an axis which does not pass through the center point of moveable electrode 48. More specifically, MEMS switch 100 is depicted as having contact structures 40, 42 and 44 arranged about an axis which passes through point X in moveable electrode 48. As a result, contact structures 40, 42 and 44 are arranged at different radial positions relative to the center point of moveable electrode 48. In some embodiments, it may be advantageous to arrange electrically inactive contact structures under areas of moveable electrode 48 which will apply less force when the MEMS switch is actuated than areas of the moveable electrode under which electrically active contact structures are arranged. Such an arrangement may induce a variation of contact force and, as a result, may improve the opening reliability of the switch. In particular, the release of one set of contact structures may allow a greater force to open the other contact structures. An exemplary arrangement of electrically active and inactive contact structures inducing such an improvement in opening reliability may, in some embodiments, include electrically active contact structures arranged closer to an edge of a moveable electrode than electrically inactive contact structures. In other cases, the arrangement electrically active and inactive contact structures may be reversed. In yet other embodiments, the relative arrangement of electrically active and inactive contact structures may not correspond to the edge and central regions of the moveable electrode.

As noted above, an even distribution of contact force may be desirable in switches in which all contact structures are electrically active to insure adequate operation of the switch. However, in embodiments in which one or more contact structures are electrically inactive, an uneven distribution of contact force, particularly for electrically inactive contact structures relative to electrically active contact structures, may advantageously offer a trade-off for better opening reliability. Variation of radial positions among contact structures, however, is not restricted to switches which include electrically inactive contact structures. As such, the contact structures shown in FIG. 8 may be all electrically active in some cases. In other cases, one or more of the contact structures shown in FIG. 8 may be electrically inactive.

In addition to having contact structures 40, 42 and 44 arranged at different radial positions relative to a center point of moveable electrode 48, MEMS switch 100 includes contact structures 40, 42 and 44 arranged at different angular positions. As a result, the arrangement of contact structures 40, 42, and 44 in FIG. 8 relative to regions 56–58 are not congruent. As noted above, the term “congruent,” as used herein, may generally refer to structure layouts exhibiting substantially similar arrangement of structures when the layouts are viewed over one another. For example, the arrangement of contact structures 40, 42 and 44 in FIG. 1 are referred to being congruent since the center points of the contact structures would generally be in direct alignment with each other if each of regions 56–58 were laid over one other. In contrast, the arrangement of contact structures 40, 42, and 44 in FIG. 8 are not congruent in that if each of regions 56–58 are laid over one other, the center points of the contact structures are not in direct alignment with each other.

Figure 9:
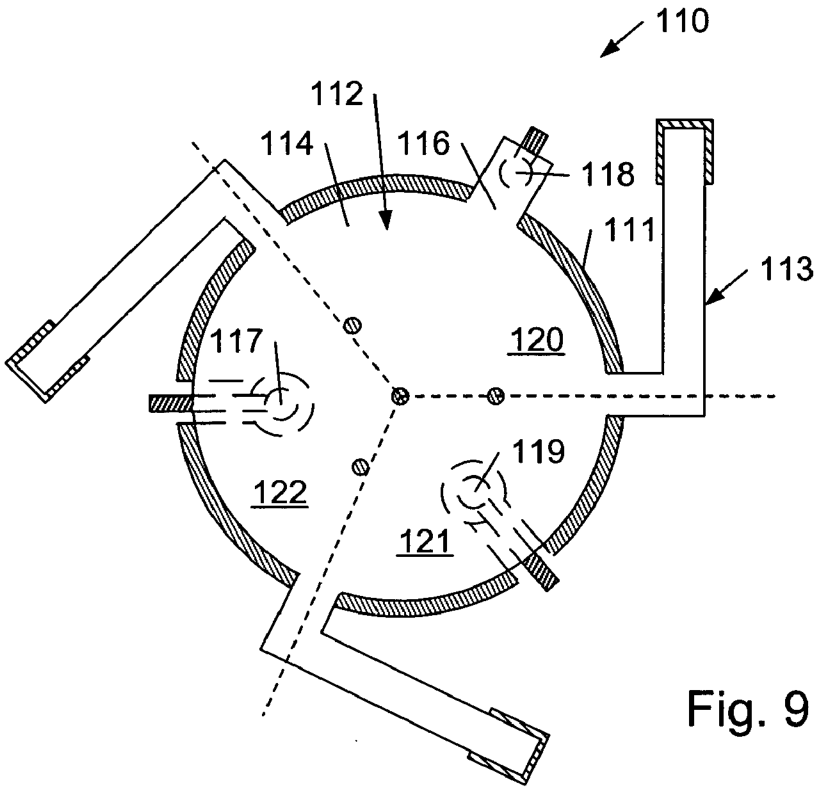
FIG. 9 depicts a plan view of yet another exemplary configuration of a plate-based MEMS switch in which a contact structure is arranged beneath an extension of the moveable electrode.

In general, departures from congruency may be induced by arranging contact structures 40, 42, and 44 at different radial distances from the edge of moveable electrode 48 relative to a center point of the electrode and/or at different angular locations. These departures from congruency are functionally homologous in that the contact structures serve to support moveable electrode upon actuation and, in some cases, also serve to pass current, but do not have similar geometrical relationships between regions. In other embodiments, departures from congruency among regions 56–58 may be induced by positioning more than one of contact structures 40, 42, and 44 in one of regions 56–58. An alternative configuration of a MEMS switch incorporating a departure from congruency relative to the arrangement of contact structures among different regions of the switch is illustrated in FIG. 9. In particular, FIG. 9 illustrates MEMS switch 110 having moveable electrode 112 having a shape which is not evenly divisible into regions having the same shape and size. As a result, contact structures 117–119 may be arranged beneath different portions of moveable electrode 112 to induce a departure from congruency. As shown in FIG. 9, moveable electrode 112 may include main portion 114 having support arms 113 arranged uniformly about its periphery. In general, main portion 114 may be substantially similar to moveable electrode 48 discussed in reference to FIG. 1. In particular, main portion 114 may have a circular shape and have holes 54 from which to allow air to pass. In other embodiments, main portion 114 may include a different shape including but not limited to those discussed in reference to FIGS. 4–6.

As shown in FIG. 9, moveable electrode 112 may further include extension 116. Contact structure 118 is shown arranged beneath extension 116 such that a departure from congruency is induced in regions 120–122 of MEMS switch 110. In some embodiments, regions 120-122 may be defined by boundaries extending from each of support arms 113 to a center point of main portion 114 of moveable electrode 112 and collectively include the entirety of fixed electrode 111 and moveable electrode 112. Regions 120–122, however, may be defined by other boundaries. In general, contact structures 117 and 119 may be arranged at any location under moveable electrode 112. In particular, contact structures 117 and 119 may be arranged at any distance between the edges and the center point of main portion 114. In addition, contact structures 117 and 119 may be arranged at any angular locations relative to support arms 113. Furthermore, contact structures 117 and 119 may be arranged in any of regions 120–122. In some cases, contact structures 117 and 119 may be arranged at substantially similar radial distances and/or angular locations such that they are concentrically arranged about the center point of main portion 114. In other embodiments, the radial distances and/or angular locations of contact structures 117 and 119 may be different. As with contact structures 40, 42 and 44 in FIGS. 1, 7 and 8, contact structures 117–119 may be of any shape or size. In addition, contact structures 117–119 may be of the same or different shape and/or size. As such, contact structures 117–119 are not restricted to the shape and size illustrated in FIG. 9.

Although extension 116 is shown at an angular location which bisects the angular locations of two of support arms 113, extension 116 may be positioned at any angular location along the periphery of main portion 114. In addition, extension 116 may include any shape and any number of segments. For example, extension 116 may be rectangular as shown in FIG. 9 or, alternatively, may be circular, triangular, or square. In addition, extension 116 may include additional segments. For example, in some embodiments, extension 116 may include one or more additional segments extending from the edge of extension 116 shown in FIG. 9. In addition or alternatively, moveable electrode 112 may include one or more additional segments extending from the edge of main portion 114. In some cases, one or more contact structures may be arranged under at least one of such additional extensions. In some embodiments, MEMS switch 110 may include more than one contact structure beneath extension 116. Fixed electrode 111 is shown below moveable electrode 112 having a shape substantially similar to main portion 114 and, therefore, may be substantially similar to fixed electrode 34 discussed in reference to FIGS. 1–2*b*. In other embodiments, however, fixed electrode 111 may include a shape which is substantially similar to main portion 114 and extension 116 combined.

Figure 10:
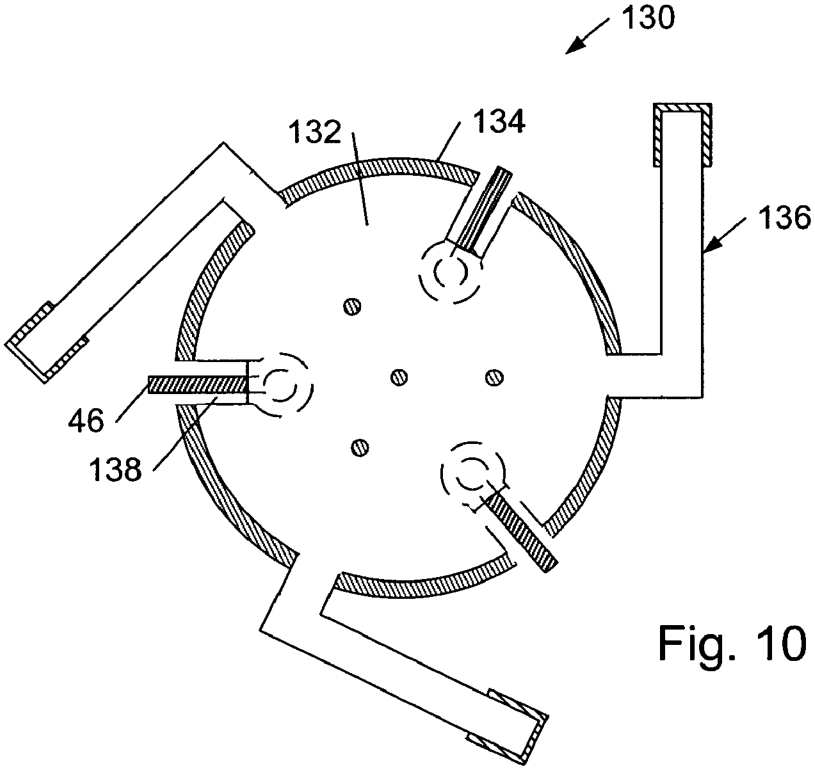
FIG. 10 depicts a plan view of yet another exemplary configuration of a plate-based MEMS switch having cut-out portions arranged within the moveable electrode, specifically in areas adjacent to underlying signal wires.

FIG. 10 illustrates yet another configuration of a MEMS switch having a moveable electrode spaced above a fixed electrode and having a multiple of three support arms spaced about a periphery of the moveable electrode. As shown in FIG. 10, MEMS switch 130 includes moveable electrode 132 spaced above fixed electrode 134 with support arms 136 spaced uniformly about a periphery of moveable electrode 132. Support arms 136, fixed electrode 134 and moveable electrode 132 may include any of the configurations discussed in reference to FIGS. 1–9. As shown in FIG. 10, moveable electrode 132 may include cutout portions 138 which are aligned with signal wires 46 coupled to contact structures 40, 42 and 44. As in MEMS switch 30, signal wires 46 may be configured to receive and pass current to contact structures 40, 42 and 44. Cutout portions 138 reduce the surface area of moveable electrode 132, which advantageously reduces the capacitance of contact structures 40, 42 and 44. As a result, MEMS switch 130 is better isolated than a switch that has a moveable electrode without such cutout portions, such as MEMS switch 30 in FIG. 1.

As shown in FIG. 10, cutout portion 138 may extend from an edge of moveable electrode 132 to an area which is aligned nearly with an edge of a contact structure. In other embodiments, cutout portions 138 may not be formed along an edge of moveable electrode 132. Rather, cutout portions 138 may be formed interior to the edges of moveable electrode 132. In any case, cutout portion 138 may formed of any shape, including but not limited to rectangular, square, circular and triangular. In some embodiments, moveable electrode 132 may include only one cutout portion which is arranged adjacent to a signal wire coupled to a contact structure used for a drain of the switch. In other embodiments, moveable electrode 132 may include more than one cutout portion and, in some embodiments, include a cut-out portion adjacent to each signal wire under the moveable electrode as shown in FIG. 10. In this manner, the placement of cutout portions 138 may be congruent across moveable electrode 132. It is noted that moveable electrode 138 is not restricted to the configurations of cutout portions shown in FIG. 10. In particular, moveable electrode 138 may include any size, shape and alignment of cutout portions over signal wires 46. Exemplary configurations of cutout portions which may be included in a moveable electrode of a MEMS switch, such as the one provided herein, are shown and described in U.S. patent application Ser. No. 10/921,696 filed on Aug. 19, 2004, which is incorporated by reference as if fully set forth herein.

Figure 11:
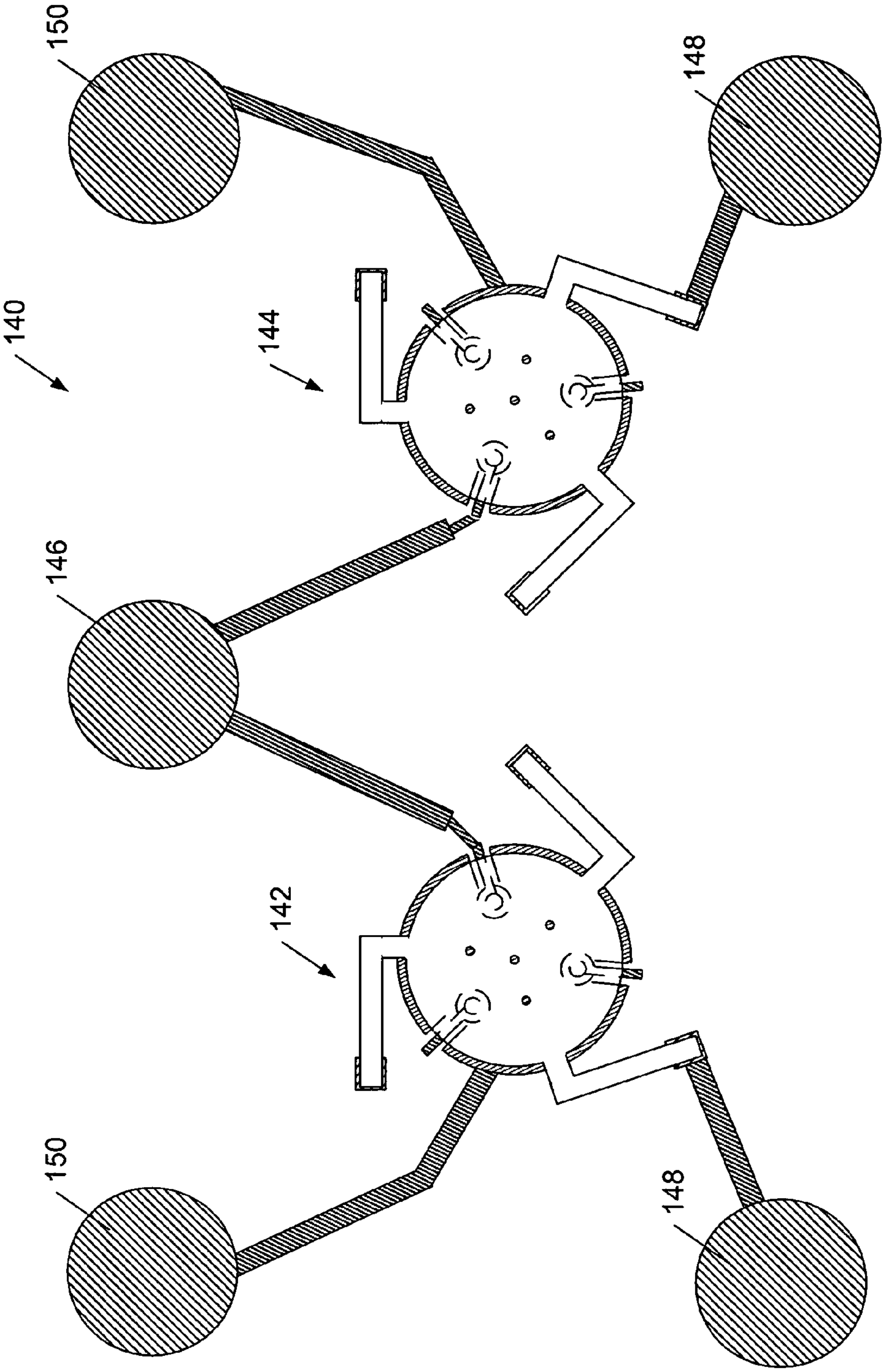
FIG. 11 depicts a plan view of an exemplary single pole double throw switch array including two of MEMS switch illustrated in FIG. 1.

FIG. 11 illustrates an exemplary single pole double throw (SPDT) switch array including two plate-based MEMS switches having configurations discussed herein. In particular, FIG. 11 illustrates SPDT switch array 140 including MEMS switches 142 and 144. It is noted that SPDT switch array 140 is merely shown to illustrate an exemplary switch array in which the MEMS switches described herein may be employed. The MEMS switches described herein, however, are not limited to SPDT arrays. On the contrary, the MEMS switches described herein may be employed within any switch array, including any number of poles or throws. In general, MEMS switches 142 and 144 may include any configuration of components discussed in reference to FIGS. 1–10. Moreover, MEMS switch 142 may include the same configuration of components as MEMS switch 144 or may include a different configuration of components than MEMS switch 144. Gate pads 150 are shown coupled to the fixed electrodes of MEMS switches 142 and 144 to supply an actuation voltage with which to move the overlying moveable electrodes.

As shown in FIG. 11, RF signal input contact 146 may be coupled to a contact structure interposed between the fixed electrodes and moveable electrodes of each switch. In addition, RF signal output pad 148 may be coupled to support arms of MEMS switches 142 and 144. Alternatively, RF signal input pad 146 may be coupled to support arms of MEMS switches 142 and 144 and RF signal output pad 148 may be coupled to contact structures of the switches. In either case, SPDT switch array 140 is configured to pass current through the moveable electrodes to and from the contact structures and the support arms. In other embodiments, instead of using a support arm to carry signal, both RF signal input pad 146 and RF signal output pad 148 may be coupled to contact structures. In this manner, SPDT switch array 140 may, in some embodiments, be used as a relay, particularly when the moveable electrodes of switches 142 and 144 include insulating materials.

FIG. 11 shows two signal wires within each of MEMS switches 142 and 144 which are not coupled to signal input or output contacts. The contact structures coupled to such signal wires are, as such, referred to as electrically inactive and simply serve to support the moveable electrode when an actuation voltage is applied to the underlying fixed electrode. Similarly, the support arms of MEMS switches 142 and 144 which are not coupled to signal input or output contacts are considered electrically inactive. In other embodiments, however, one or more of the contact structures which are not coupled to signal input or output contacts may be wired in parallel with a contact structure which is wired to a signal input or output contact and, therefore, may be configured to carry a signal. In such embodiments, all of such contact structures may be considered electrically active.

Figure 12:
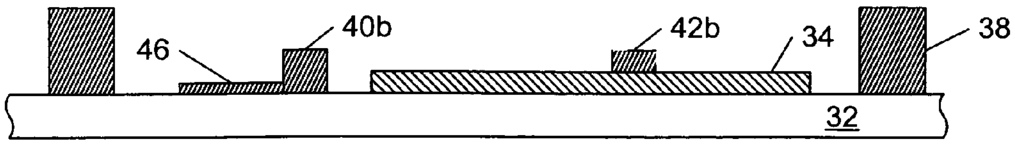
FIG. 12 depicts a cross sectional view of an exemplary topography in which a first set of components is formed upon a substrate.

Exemplary methods for fabricating the MEMS switch described herein are discussed in reference to FIGS. 12–23. Although the reference numbers and arrangement of components formed in reference to FIGS. 12–23 are similar to the components described in reference to FIGS. 1–2*c*, the methods may be modified to accommodate all configurations described herein. In particular, the methods may be modified to include different shapes, different arrangements of components and different component materials. FIG. 12 illustrates the formation of a first level of components upon substrate 32, including fixed electrode 34, contact sub-structures 40*b* and 42*b*, signal wires 46 and support vias 38. In addition, the first level of components may include one or more additional contact structures such as contact sub-structure 44*b*, for example. Contact sub-structure 42*b* is shown behind fixed electrode 34 and, therefore, appears to be formed upon fixed electrode 34. Contact sub-structure 42*b*, however, is formed upon substrate 32 as is contact sub-structures 40*b* and 44*b*.

Two of support vias 38 and signal wires 46 are not shown in FIG. 12 due to the line along which the cross-sectional view of the topography is illustrated. The topography illustrated in FIG. 12, however, may include multiple support vias and signal wires formed upon substrate 32. In other embodiments, support via 38 may be fabricated during the fabrication of a different layer of components. In particular, support via 38 may be fabricated with moveable electrode 48 and contact sub-structures 40*a*, 42*a* and 44*a* instead of being fabricated with contact sub-structures 40*b*, 42*b* and 44*b*, fixed electrode 34 and signal wire 46. The fabrication of support vias 38 during such an alternative process step is described in reference to FIGS. 15 and 16 below.

In general, fixed electrode 34, contact sub-structures 40*b* and 42*b*, signal wire 46 and support via 38 may be formed by depositing materials upon substrate 32 and patterning the material using a plurality of masks such that the variation of height among the components may be obtained. In particular, a material may be deposited upon substrate 32 and patterned at least three or four times to distinguish the variation of heights between support via 38, contact sub-structures 40*b* and 42*b*, fixed electrode 34 and signal wire 46. Alternatively, the components may be fabricated by separately depositing and patterning material for the components. As noted above, contact sub-structures 40*b*, 42*b*, and 44*b* may be formed to have different heights in some embodiments. As such, in some embodiments, the fabrication process may include additional masking patterns to incorporate such a variation in contact structure heights. In general, fixed electrode 34, contact sub-structures 40*b* and 42*b*, signal wire 46 and support via 38 may include gold, chromium, copper, titanium, tungsten, or alloys of such metals. In some embodiments, fixed electrode 34, contact sub-structures 40*b* and 42*b*, signal wire 46 and/or support via 38 may include a multi-layer structure including a combination of such materials. Although fixed electrode 34 is shown having a different cross-hatched pattern than the rest of the components formed upon substrate 32, fixed electrode 34 may, in some embodiments, include the same material as any one of such components. In yet other embodiments, fixed electrode 34 may include a different material than any one of such components.

In an embodiment in which substrate 32 is incorporated into an integrated circuit, substrate 32 may be, for example, a silicon, ceramic, or gallium arsenide substrate. Alternatively, substrate 32 may be glass, polyimide, metal, or any other substrate material commonly used in the fabrication of microelectromechanical devices. For example, substrate 32 may be a monocrystalline silicon substrate or an epitaxial silicon layer grown on a monocrystalline silicon substrate. In addition, substrate 32 may include a silicon on insulator (SOI) layer, which may be formed upon a silicon wafer.

In some embodiments, one or all of contact sub-structures 40*b*, 42*b* and 44*b* may include different materials than each other. Such a variation of materials may be particularly advantageous for contact structures which are electrically inactive such that the speed at which the MEMS switch is operated is not affected. For example, in embodiments in which contact sub-structure 42*b* is not coupled to an RF signal input contact or an RF signal output contact, contact sub-structure 42*b* may include a material which is less susceptible to stiction than a material used for contact sub-structures 40*b* and 44*b*. For example, in some embodiments, contact sub-structure 42*b* may include rhodium or osmium and contact sub-structures 40*b* and 44*b* may include gold. Other material configurations for the contact structures may be used for MEMS switches, depending on the design specifications of the switch. Fabricating one or more contact structures with a material which is less susceptible to stiction may advantageously allow the switch to open more easily since a lower restoring force will be needed to open the contact structure with such a material. Opening one or more contact structures induces a greater force to open the remaining closed contact structures. In any case, contact sub-structures 40*b*, 42*b* and/or 44*b* may, in some embodiments, include a non-conductive material such as silicon dioxide ($SiO_2$), silicon nitride ($Si_xN_y$), silicon oxynitride ($SiO_xN_y(H_z)$), or silicon dioxide/silicon nitride/silicon dioxide (ONO). For example, contact sub-structures 40*b*, 42*b* and/or 44*b* may include a dielectric cap layer arranged upon the conductive material. Such a dielectric cap layer may allow for capacitive coupling at the contact structures.

Figure 13:
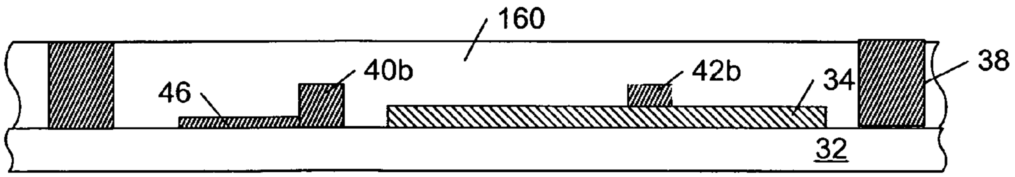
FIG. 13 depicts a cross sectional view of the exemplary topography subsequent to a deposition of a sacrificial layer upon the first set of components illustrated in FIG. 12.

FIG. 13 illustrates the formation of sacrificial layer 160 upon fixed electrode 34, contact sub-structures 40*b* and 42*b*, signal wire 46 and support via 38. Sacrificial layer 160 may be deposited conformally or non-conformally, depending on the deposition technique used and the composition of the layer. Any deposition technique known for the fabrication of MEMS devices may be used, including but not limited to plating, chemical vapor deposition (CVD), and physical vapor deposition (PVD) techniques. In some embodiments, sacrificial layer 160 may include a dielectric material, such as but not limited to polyimide, benzocyclobutene (BCB), silicon dioxide, silicon nitride or silicon oxynitride. Other materials which may be selectively removed at later stages of the process relative to the contact structures and electrodes of the topography may also or alternatively be used.

In a preferred embodiment, sacrificial layer 160 is formed at a level spaced above the uppermost surface of contact sub-structures 40*b,* 42*b* and 44*b*. In this manner, a moveable electrode may be formed spaced above fixed electrode 34 and contact sub-structures 40*b,* 42*b* and 44*b*. In some embodiments, sacrificial layer 160 may be formed to be substantially coplanar with support via 38. Alternatively, sacrificial layer 160 may be formed at a level spaced above support via 38 and a trench may be formed within sacrificial layer 160 to contact support via 38. In yet other embodiments, support via 38 may not be formed prior to the deposition of sacrificial layer 160. In such embodiments, support via 38 may be formed in a manner similar to contact sub-structures 40*a,* 42*a* and/or 44*a,* which is described below.

Figure 14:
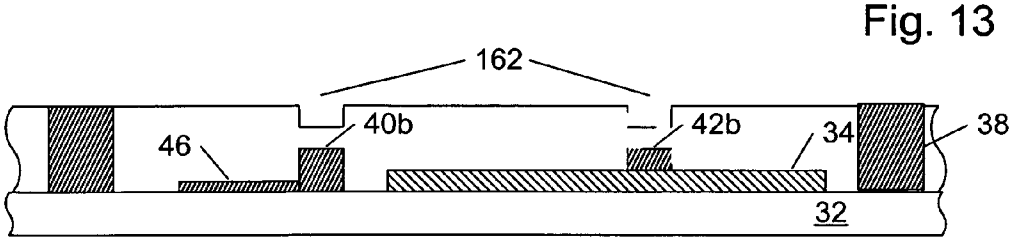
FIG. 14 depicts a cross sectional view of the exemplary topography subsequent to a formation of trenches within the sacrificial layer illustrated in FIG. 13.

As shown in FIG. 14, trenches 162 may be formed within sacrificial layer 160. Such trenches may be used to form contact sub-structures 40*a* and 42*a*. Additional trenches may be formed within sacrificial layer 160 to form contact structure 44*a* and/or all or portion of support via 38, depending on the design specifications of the device and the method of fabrication desired. In an embodiment in which support via 38 is formed with contact sub-structures 40*a,* 42*a* and 44*a* or the contact structures are formed to have different thicknesses, different patterning masks may be used to account for the variation in depths of the trenches. As noted above, one or more of contact sub-structures 40*a,* 42*a* and/or 44*a* may be omitted from the MEMS structure in some embodiments and, therefore, one or more of trenches 162 may not be formed. In general, the formation of trenches 162 and any additional trenches may employ any etching techniques used in the fabrication of MEMS devices, including dry and wet etching techniques.

Figure 15:
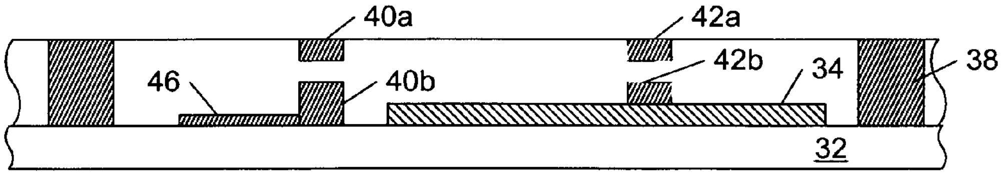
FIG. 15 depicts a cross sectional view of the exemplary topography subsequent to a deposition of a conductive layer within the trenches illustrated in FIG. 14.

Subsequent to the formation of trenches 162, a conductive material, such as gold, chromium, copper, titanium, tungsten, or alloys of such metals, may be deposited as shown in FIG. 15 to form contact sub-structures 40*a,* 42*a* and/or 44*a* and, in some embodiments, all or a portion of via supports 38. In some embodiments, a combination of conductive materials may be deposited such that contact sub-structures 40*a,* 42*a* and/or 44*a* and all or a portion of via supports 38 are formed as multi-layer structures. The deposition of the conductive material may include any deposition technique used to fabricate MEMS devices, including conformal, non-conformal and selective deposition processes as well as successive masking. In some embodiments, the fabrication of the structures may further include polishing the conductive material.

Figure 16:
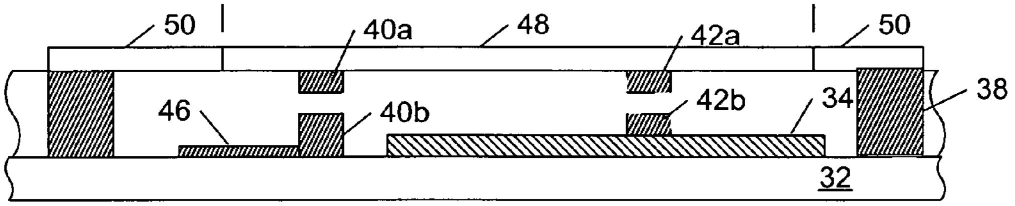
FIG. 16 depicts a cross sectional view of the exemplary topography subsequent to a formation of a conductive layer upon the filled trenches and sacrificial layer illustrated in FIG. 15.
Figure 17:
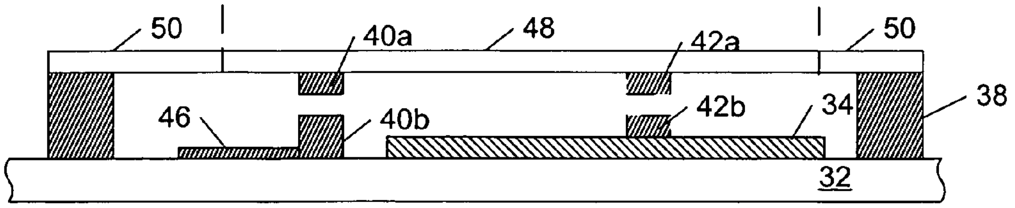
FIG. 17 depicts a cross sectional view of the exemplary topography subsequent to a removal of the sacrificial layer illustrated in FIG. 16.

As shown in FIG. 16, the method for fabricating the MEMS switch provided herein may further include the formation of moveable electrode 48 and support arms 50 upon contact sub-structures 40*a* and 42*a,* support via 38 and sacrificial layer 160. In some embodiments, the formation of moveable electrode 48 and support arms 50 may include depositing and patterning a single material such that support arms 50 are contiguous extensions from moveable electrode 48. Dotted lines are shown in FIG. 16 distinguishing moveable electrode 48 and support arms 50. The dotted lines are merely used to illustrate the relative position of the components and, therefore, are not part of topography. As with the formation of first level of components on substrate 32, moveable electrode 48 and support arms 50 may be formed from any deposition techniques, including but not limited to plating, CVD, and PVD. In addition, moveable electrode 48 and support arms 50 may be formed from any number of patterning masks. After formation of moveable electrode 48 and support arms 50, sacrificial layer 160 may be removed, thereby suspending the moveable electrode 48, support arms 50 and contact sub-structures 40*a,* 42*a* and/or 44*a* above fixed electrode 34, portions of signal wire 46 and contact sub-structures 40*b,* 42*b* and 44*b* as shown in FIG. 17.

Figure 18:
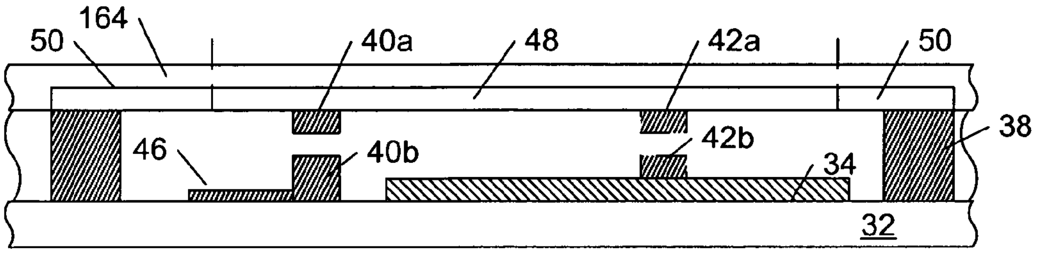
FIG. 18 depicts a cross sectional view of the exemplary topography subsequent to a deposition of an additional conductive layer upon the conductive layer illustrated in FIG. 15.

As noted above, moveable electrode 48 may be formed to have a larger thickness than support arms 50 in some cases. As such, the method of fabricating the MEMS device provided herein may sometimes, follow a sequence of steps different than those described in reference to FIGS. 12–17. For example, in some embodiments, the method may include any one of the steps described in reference to FIGS. 18–23 rather than the steps described FIGS. 15–17. FIG. 18 depicts a process step in which an additional layer is formed above the topography depicted in FIG. 16. In particular, FIG. 18 depicts additional layer 164 formed upon moveable electrode 48, support arms 50 and exposed portions of sacrificial layer 162. In some embodiments, additional layer 164 may include a conductive material, such as but not limited to gold, chromium, copper, titanium, tungsten, or any alloys of such metals. In other embodiments, additional layer 164 may include a dielectric material, such as but not limited to polyimide, benzocyclobutene (BCB), silicon dioxide, silicon nitride or silicon oxynitride. In yet other embodiments, additional layer 164 may include a combination of conductive and/or dielectric materials arranged as a multi-layer structure. In some embodiments, additional layer 164 may be the same material as the material used to form moveable electrode 48 and support arms 50 in FIG. 16. In yet other embodiments, additional layer 164 may be different from the material used to form moveable electrode 48 and support arms 50.

Figure 19:
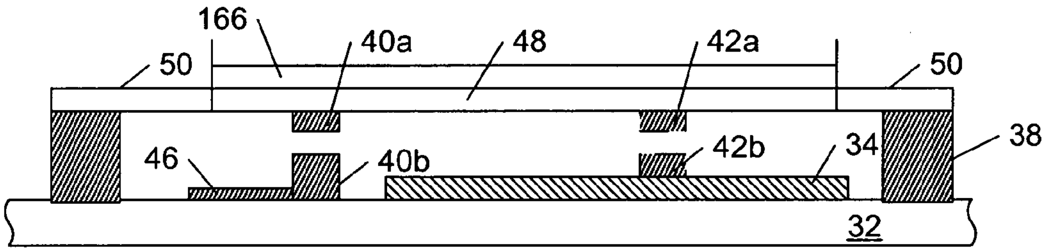
FIG. 19 depicts a cross sectional view of the exemplary topography subsequent to patterning the additional conductive layer illustrated in FIG. 18.
Figure 20:
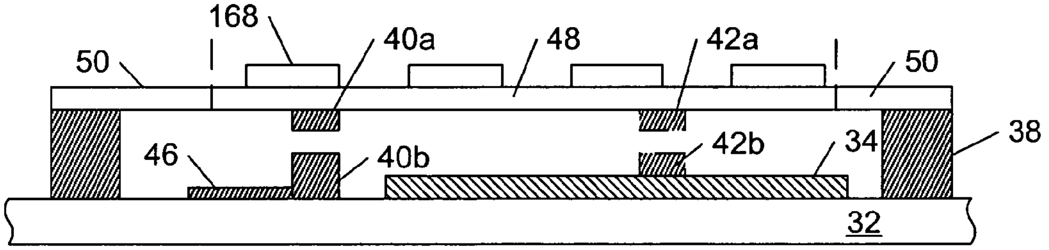
FIG. 20 depicts a cross sectional view of the exemplary topography subsequent to patterning the additional conductive layer illustrated in FIG. 18 into a plurality of portions above the conductive layer formed in reference to FIG. 15.

In any case, the thickness of additional layer 164 may be between approximately 1 micron and approximately 10 microns, although thicker or thinner layers may be used as well. In some cases, additional layer 164 may be patterned to form contiguous layer 166 above moveable electrode 48 having substantially similar dimensions as moveable electrode 48 as shown in FIG. 19. In this manner, moveable electrode 48 may be thicker than support arms 50. In yet other embodiments, additional layer 164 may be patterned to form a plurality of portions 168 above moveable electrode 48 as shown in FIG. 20. In this manner, moveable electrode 48 may include an average thickness greater than support arms 50. In general, portions 168 may include any shape or configuration, including but not limited to rectangular, square, circular, and triangular figures. In addition, portions 168 may include any number of distinct figures. In any case, the moveable electrode resulting from the process steps described in reference to FIGS. 19 and 20 may include a base layer and one or more distinct segments of metal formed upon the base layer. As shown in FIGS. 19 and 20, sacrificial layer 160 may be removed subsequent to patterning additional layer 164.

Figure 21:
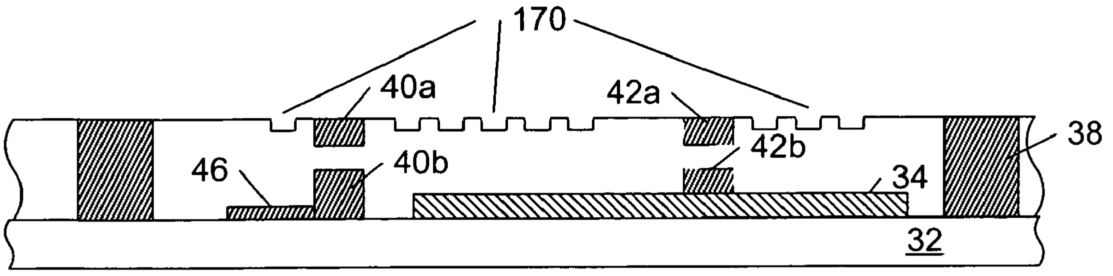
FIG. 21 depicts a cross sectional view of the exemplary topography subsequent to a formation of trenches with the sacrificial layer illustrated in FIG. 15.
Figure 22:
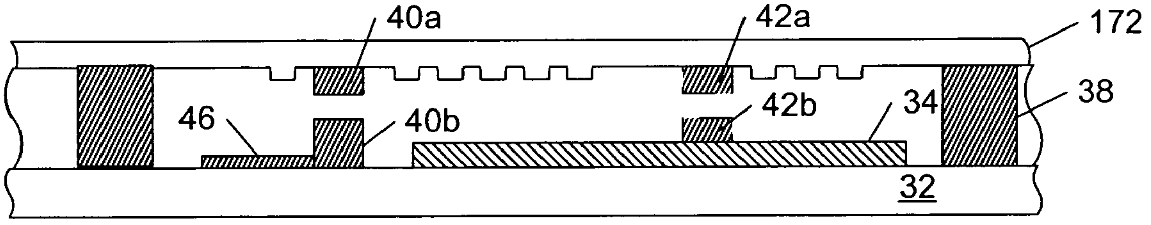
FIG. 22 depicts a cross sectional view of the exemplary topography subsequent to a deposition of a conductive layer within and above the trenches illustrated in FIG. 21.
Figure 23:
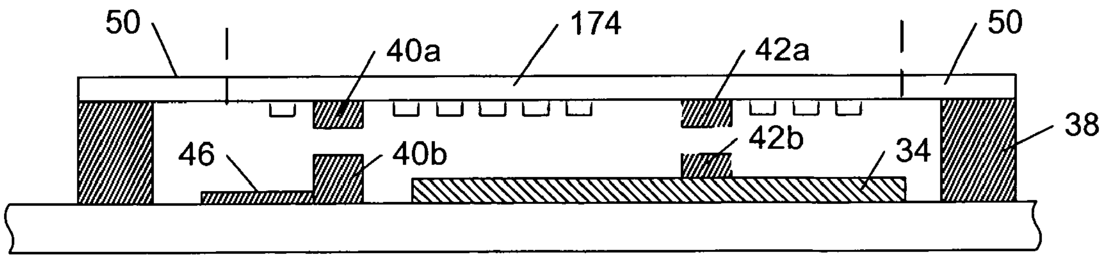
FIG. 23 depicts a cross sectional view of the exemplary topography subsequent to patterning the conductive layer illustrated in FIG. 22.

Other steps that may be used for the fabrication of the MEMS switch provided herein are depicted in FIGS. 21–23. In particular, FIG. 21 illustrates the patterning of sacrificial layer 160 subsequent to the formation of contact sub-structures 40*a* and 42*a* as described in reference to FIG. 15. As shown in FIG. 21, trenches 170 may be formed within sacrificial layer 160 subsequent to the formation of contact sub-structures 40*a* and 42*a*. In some embodiments, trenches 170 may be formed with depths smaller than the thicknesses of contact sub-structures 40*a* and 42*a.* In this manner, contact between fixed electrode 34 and the subsequently formed moveable electrode during actuation of the switch may be prevented. As shown in FIG. 22, conductive layer 172 may be deposited within trenches 170 and to a level spaced above trenches 170. Conductive layer 172 may include any conductive material such as but not limited to gold, chromium, copper, titanium, tungsten, or alloys of such metals and may be formed by any deposition techniques used in MEMS fabrication processes. In some embodiments, conductive layer 172 may include a multi-layer structure including a combination of such materials.

Subsequent to its deposition, conductive layer 172 may be patterned to form moveable electrode 174 and support arms 50 as shown in FIG. 23. Such a patterning process may be similar to the patterning process used to form moveable electrode 48 and support arms 50 described in reference to FIG. 16. Moveable electrode 174, however, differs from moveable electrode 48 in that it has an average thickness greater than support arms 50 due to filling trenches 170 during the formation of the electrode. More specifically, moveable electrode 174 may include extensions on the underside of the electrode due to the filling of trenches 170. As shown in FIG. 23, sacrificial layer 160 may be removed subsequent to patterning additional conductive layer 172.

It will be appreciated to those skilled in the art having the benefit of this disclosure that this invention is believed to provide a plate-based MEMS switch having a multiple of three support arms extending about the periphery of the moveable electrode of the switch. Further modifications and alternative embodiments of various aspects of the invention will be apparent to those skilled in the art in view of this description. For example, the steps described above in reference to FIGS. 12–23 may not include all steps used in forming the microelectromechanical device provided herein, and certainly do not include all steps used in forming a typical circuit containing such a device. The above-described steps may be combined with other steps used for, e.g., transistor fabrication in forming a complete circuit. Further steps may include those relating to, e.g., interconnection, passivation, and packaging of a circuit. It is intended that the following claims be interpreted to embrace all such modifications and changes and, accordingly, the drawings and the specification are to be regarded in an illustrative rather than a restrictive sense.

What is claimed is:

1. A microelectromechanical system (MEMS) switch, comprising:

a fixed electrode formed upon a substrate;

a moveable electrode spaced above the fixed electrode; and a multiple of three support arms extending from the moveable electrode to different support vias coupled to the substrate, wherein the multiple of three support arms are uniformly spaced about the periphery of the moveable electrode relative to each other, and wherein each of the multiple of three support arms juts out beyond adjacent outermost edges of the moveable electrode.

2. The MEMS switch of claim 1, wherein the multiple of three support arms extend radially from the moveable electrode.

3. The MEMS switch of claim 1, wherein at least one of the multiple of three support arms comprises:

a first portion extending radially from the moveable electrode; and a second portion extending from the first portion at an angle greater than approximately 0 degrees relative to the first portion.

4. The MEMS switch of claim 3, wherein the second portion extends at an angle approximately 90 degrees from the first portion.

5. The MEMS switch of claim 3, wherein the second portion comprises a plurality of meandering sections.

6. The MEMS switch of claim 1, wherein the multiple of three support arms comprise lengths between approximately 100 micron and approximately 1000 microns.

7. The MEMS switch of claim 1, wherein the multiple of three support arms comprise widths between approximately 25 micron and approximately 100 microns.

8. The MEMS switch of claim 1, wherein the moveable electrode is circular, and wherein the multiple of three support arms comprise widths between approximately 5% and approximately 20% of the diameter of the moveable electrode.

9. The MEMS switch of claim 1, wherein the shape of the moveable electrode is a three-pointed figure.

10. The MEMS switch of claim 1, wherein the shape of the moveable electrode is a truncated circle.

11. The MEMS switch of claim 1, further comprising a plurality of contact structures having portions extending into a space between the fixed electrode and the moveable electrode, wherein the relative arrangement of the plurality of contact structures are congruent among three regions of the MEMS switch which collectively comprise the entirety of fixed electrode and entirety of the moveable electrode.

12. The MEMS switch of claim 1, further comprising a plurality of contact structures having portions extending into a space between the fixed electrode and the moveable electrode, wherein the relative arrangement of the plurality of contact structures are not congruent among three regions of the MEMS switch which collectively comprise the entirety of fixed electrode and entirety of the moveable electrode.

13. A microelectromechanical system (MEMS) switch, comprising:

a fixed electrode;

a moveable electrode spaced apart from the fixed electrode;

a plurality of contact structures having portions extending into a space between the fixed electrode and the moveable electrode; and a plurality of support arms extending from the moveable electrode, wherein the relative arrangement of the plurality of support arms and the plurality of contact structures are congruent among three regions of the MEMS switch which collectively comprise the entirety of the fixed electrode and the entirety of the moveable electrode.

14. The MEMS switch of claim 13, wherein at least one of the plurality of contact structures comprises a different conductive material than another of the plurality of contact structures.

15. The MEMS switch of claim 13, wherein the plurality of contact structures and plurality of support arms are concentrically arranged about the same axis.

16. The MEMS switch of claim 15, wherein each of the plurality of contact structures is aligned between the axis and one of the plurality of support arms.

17. The MEMS switch of claim 15, wherein each of the plurality of contact structures is arranged at an angular location that is distinct from the angular locations that the plurality of support arms are arranged.

18. The MEMS switch of claim 17, wherein each of the plurality of contact structures is arranged at an angular location which bisects angular locations of two adjacent support arms.

19. The MEMS switch of claim 15, wherein the plurality of contact structures are concentrically spaced from the axis by a distance between approximately 25% and approximately 100% of the span from the axis to the edge of the moveable electrode.

20. The MEMS switch of claim 19, wherein the plurality of contact structures are concentrically arranged at a distance approximately midway between the axis and the edge of the moveable electrode.

21. A microelectromechanical system (MEMS) switch, comprising:

a moveable electrode;

three support arms extending from the moveable electrode, wherein the three support arms are uniformly spaced about the periphery of the moveable electrode relative to each other; and a plurality of contact structures arranged adjacent and relative to three regions of the moveable electrode defined by boundaries extending from each of the three support arms to a central region of the moveable electrode, wherein the arrangement of one or more of the contact structures adjacent to one of the three regions is not congruent with the arrangement of one or more of the contact structures adjacent to the other two regions.

22. The MEMS switch of claim 21, wherein the moveable electrode comprises:

a main section from which the three support arms extend; and an extension from the main section interposed between two of the three support arms, wherein at least one of the plurality of contact structures is arranged adjacent to the extension.

23. The MEMS switch of claim 22, wherein the moveable electrode comprises one or more additional extensions along its periphery, and wherein at least one of the plurality of contact structures is arranged adjacent to at least one of the one or more additional extensions.

24. The MEMS switch of claim 21, wherein the plurality of contact structures comprise:

one or more electrically active contact structures; and one or more electrically inactive contact structures, wherein the electrically inactive contact structures are arranged under areas of the moveable electrode which will apply less force when the MEMS switch is actuated than areas of the moveable electrode under which the electrically active contact structures are arranged.

25. The MEMS switch of claim 24, wherein the electrically active contact structures are arranged closer to the edge of the moveable electrode than the electrically inactive contact structures.

26. A microelectromechanical system (MEMS) switch, comprising:

a fixed electrode formed upon a substrate;

a moveable electrode spaced above the fixed electrode; and a single set of support arms having borders extending from the moveable electrode to different support vias coupled to the substrate, wherein the single set of support arms consists of a multiple of three support arms, and wherein the MEMS switch is void of portions of the moveable electrode along at least one of the borders of each of the support arms.

27. The MEMS switch of claim 26, further comprising a plurality of contact structures having portions extending into a space between the fixed electrode and the moveable electrode.

28. The MEMS switch of claim 27, wherein the relative arrangement of the plurality of contact structures is congruent relative to locations of the multiple of three support arms.

29. The MEMS switch of claim 27, wherein the arrangement of the contact structures is not congruent relative to locations of the multiple of three support arms.

30. The MEMS switch of claim 27, wherein the MEMS switch is substantially absent of a contact structure in a space between the fixed electrode and a center point of the moveable electrode.

31. The MEMS switch of claim 27, wherein the plurality of contact structures are concentrically arranged about an axis which does not extend through a center point of the moveable electrode.

32. The MEMS switch of claim 27, wherein one of the multiple of three support arms and one of the contact structures are electrically active, and wherein the other of the contact structures and the other of the multiple of three support arms are electrically inactive.

33. The MEMS switch of claim 27, wherein the moveable electrode comprises a cutout portion which is arranged proximate to one of the contact structures.

34. The MEMS switch of claim 26, wherein the moveable electrode is thicker than each of the multiple of three support arms.

35. The MEMS switch of claim 26, wherein the moveable electrode comprises:

a base layer of metal having a substantially uniform thickness; and one or more distinct segments of metal formed upon the base layer.

36. The MEMS switch of claim 26, wherein an underside of the moveable electrode comprises extensions.

37. A switch array, comprising:

a plurality of MEMS switches, wherein at least one of the plurality of MEMS switches comprises:

a fixed electrode formed upon a substrate;

a moveable electrode spaced above the fixed electrode; and a single set of support arms extending from the moveable electrode to different support vias coupled to the substrate, wherein the single set of support arms consists of a multiple of three support arms;

a signal input pad coupled to each of the plurality of MEMS switches; and a set of signal output pads each coupled to a different MEMS switch of the plurality of MEMS switches.

38. The switch array of claim 37, wherein the least one of the plurality of MEMS switches further comprises a plurality of contact structures having portions extending into a space between the fixed electrode and the moveable electrode, and wherein the relative arrangement of the plurality of contact structures is congruent among three regions of the MEMS switch which collectively comprise the entirety of fixed electrode and entirety of the moveable electrode.

39. The switch array of claim 37, wherein the least one of the plurality of MEMS switches further comprising a plurality of contact structures having portions extending into a space between the fixed electrode and the moveable electrode, and wherein the relative arrangement of the plurality of contact structures is not congruent among three regions of the MEMS switch which collectively comprise the entirety of fixed electrode and entirety of the moveable electrode.

* * * * *